United States Patent
Ma et al.

(10) Patent No.: US 11,528,506 B2
(45) Date of Patent: Dec. 13, 2022

(54) INTRA-PREDICTION USING A CROSS-COMPONENT LINEAR MODEL IN VIDEO CODING

(71) Applicant: Huawei Technologies Co., Ltd., Shenzhen (CN)

(72) Inventors: Xiang Ma, Shenzhen (CN); Jianle Chen, San Diego, CA (US); Haitao Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/146,955

(22) Filed: Jan. 12, 2021

(65) Prior Publication Data

US 2021/0136409 A1    May 6, 2021

Related U.S. Application Data

(63) Continuation of application No. PCT/US2019/041526, filed on Jul. 12, 2019.

(Continued)

(51) Int. Cl.
*H04N 19/11* (2014.01)
*H04N 19/593* (2014.01)
(Continued)

(52) U.S. Cl.
CPC ........... *H04N 19/593* (2014.11); *H04N 19/11* (2014.11); *H04N 19/132* (2014.11); *H04N 19/176* (2014.11); *H04N 19/186* (2014.11)

(58) Field of Classification Search
CPC .... H04N 19/593; H04N 19/11; H04N 19/132; H04N 19/176; H04N 19/186
(Continued)

(56) References Cited

U.S. PATENT DOCUMENTS

| | | | |
|---|---|---|---|
| 8,406,559 B2 | 3/2013 | Wu | |
| 9,288,500 B2 | 3/2016 | Budagavi | |

(Continued)

FOREIGN PATENT DOCUMENTS

| | | |
|---|---|---|
| CN | 106664425 A | 5/2017 |
| EP | 3021578 A1 | 5/2016 |

(Continued)

OTHER PUBLICATIONS

Series H: Audiovisual and Multimedia Systems Infrastructure of audiovisual services—Coding of moving video; Advanced video coding for generic audiovisual services, Recommendation ITU-T H.264, Jun. 2019, 836 pages.

(Continued)

*Primary Examiner* — Nguyen T Truong
(74) *Attorney, Agent, or Firm* — Conley Rose, P.C.

(57) ABSTRACT

A video coding mechanism is disclosed. The mechanism includes receiving a video signal partitioned into a chroma block and a first neighboring luma block. The mechanism also includes encoding prediction information for chroma samples of the chroma block into a bitstream. The prediction information for the chroma samples is determined via intra-prediction based on down-sampled neighboring luma samples. The down-sampled neighboring luma samples are generated from a single row of luma samples from the first neighboring luma block. A bitstream including the prediction information for the chroma samples is transmitted to support decoding and display of the chroma samples.

22 Claims, 19 Drawing Sheets

Related U.S. Application Data

(60) Provisional application No. 62/697,268, filed on Jul. 12, 2018.

(51) Int. Cl.
*H04N 19/132* (2014.01)
*H04N 19/176* (2014.01)
*H04N 19/186* (2014.01)

(58) Field of Classification Search
USPC ..................................................... 375/240.12
See application file for complete search history.

(56) References Cited

U.S. PATENT DOCUMENTS

| | | |
|---|---|---|
| 9,560,359 B2 | 1/2017 | Lei et al. |
| 2015/0373349 A1 | 12/2015 | Zhang et al. |
| 2016/0277762 A1 | 9/2016 | Zhang et al. |
| 2018/0063527 A1 | 3/2018 | Chen et al. |
| 2018/0077426 A1 | 3/2018 | Zhang et al. |

FOREIGN PATENT DOCUMENTS

| | | |
|---|---|---|
| JP | 2018056685 A | 4/2018 |
| WO | 2014154094 A1 | 10/2014 |

OTHER PUBLICATIONS

"Series H: Audiovisual and Multimedia Systems Infrastructure of audiovisual services Coding of moving video High efficiency video coding," Recommendation ITU-T H. 265, Apr. 2013, 317 pages.

Document: JVET-K0204-v1, "Non-CE3: On cross-component linear model simplification," Joint Video Experts Team (JVET) of ITU-T SG 16 WP 3 and ISO/IEC JTC 1/SC 29/WG 11, 11th Meeting: Ljubljana, SI, Jul. 10-18, 2018, 3 pages.

Document JVET-G1001_v1, "Algorithm description of Joint Exploration Test Model 7 (JEM7)," Joint Video Exploration Team (JVET) of ITU-T SG 16 WP 3 and ISO/IEC JTC 1/SC 29/WG 11, 7th Meeting: Torino, IT, Jul. 13-21, 2017, 51 pages.

Document: JCTVC-H0544, "CE6.a: New modes (LML and LMA) for chroma intra prediction," Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, 7 pages.

JVET-K0204-v2, Laroche, G., et al., "Non-CE3: On cross-component linear model simplification", Joint Video Experts Team (JVET) of ITU-T SG 16 WP 3 and ISO/IEC JTC 1/SC 29/WG 11,11th Meeting: Ljubljana, SI, Jul. 10-18, 2018, 5 pages.

Zhang, K., et al., "Multi-model Based Cross component Linear Model Chroma Intra-prediction for Video Coding", VCIP 2017, Dec. 10-13, 2017, St. Petersburg, U.S.A., 4 pages.

INTRA-PREDICTION USING A CROSS-COMPONENT LINEAR MODEL IN VIDEO CODING

CROSS-REFERENCE TO RELATED APPLICATIONS

This patent application is a continuation of International Application No. PCT/US2019/041526, filed Jul. 12, 2019 by Xiang Ma, et. al., and titled "Intra-Prediction Using A Cross-Component Linear Model In Video Coding," which claims the benefit of U.S. Provisional Patent Application No. 62/697,268, filed Jul. 12, 2018 by Xiang Ma, et. al., and titled "Intra Prediction Using Cross-Component Linear Model," which are hereby incorporated by reference.

TECHNICAL FIELD

The present disclosure is generally related to video coding, and is specifically related to using luma samples to predict chroma samples via intra-prediction as part of a video coding mechanism.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method for cross-component prediction of a block of video data, the method comprising: down-sampling a reconstructed luma block to obtain a down-sampled luma block, the reconstructed luma block corresponding to a chroma block; obtaining first down-sampled samples of reconstructed top neighboring luma samples that are above the reconstructed luma block or second down-sampled samples of reconstructed left neighboring luma samples that are left to the reconstructed luma block, wherein the reconstructed top neighboring luma samples are within a single row being adjacent to the reconstructed luma block; deriving, parameters of a linear model (LM), based on the first or second down-sampled samples and reconstructed neighboring chroma samples that are above the chroma block or reconstructed neighboring chroma samples that are left to the chroma block; and generating predicted chroma values of the chroma block based on the parameters of the LM and the down-sampled luma block.

In an embodiment, the disclosure includes a method for cross-component prediction of a block of video data, the method comprising: down-sampling a reconstructed luma block to obtain a down-sampled luma block, the reconstructed luma block corresponding to a chroma block; obtaining first down-sampled samples of reconstructed top neighboring luma samples that are above (immediately above) the reconstructed luma block and second down-sampled samples of reconstructed left neighboring luma samples that are left to the reconstructed luma block, wherein the reconstructed top neighboring luma samples are within a single row being adjacent to the reconstructed luma block; deriving, parameters of a linear model (LM), based on the first down-sampled samples and the second down-sampled samples, and reconstructed neighboring chroma samples that are above the chroma block and reconstructed neighboring chroma samples that are left to the chroma block; and generating predicted chroma values of the chroma block based on the parameters of the LM and the down-sampled luma block.

Optionally, in any of the preceding aspects, another implementation of the aspect provides, wherein the first down-sampled luma samples are obtained by down-sampling on the reconstructed top neighboring luma samples being within the single row.

Optionally, in any of the preceding aspects, another implementation of the aspect provides, wherein the second down-sampled luma samples are obtained by down-sampling on the reconstructed left neighboring luma samples.

Optionally, in any of the preceding aspects, another implementation of the aspect provides, wherein the reconstructed left neighboring luma samples are within N columns which are left to the reconstructed luma block, wherein $0<N<=3$ and N is a positive integer.

Optionally, in any of the preceding aspects, another implementation of the aspect provides, wherein the reconstructed left neighboring luma samples are within a single column which is left (immediately left) to the reconstructed luma block.

Optionally, in any of the preceding aspects, another implementation of the aspect provides, wherein the linear model (LM) comprises one or more of the following linear model of: cross-component linear model (CCLM) mode, multi-directional linear model (MDLM) mode, and multiple model linear model (MMLM) mode.

In an embodiment, the disclosure includes a method for cross-component prediction of a block of video data, the method comprising: down-sampling a reconstructed luma block to obtain a down-sampled luma block, the reconstructed luma block corresponding to a chroma block; determining a max luma value and a min luma value based on first down-sampled samples of reconstructed top neighboring luma samples that are above the reconstructed luma block or second down-sampled samples of reconstructed left neighboring luma samples that are left to the reconstructed luma block, wherein the reconstructed top neighboring luma samples are within a single row being adjacent to the reconstructed luma block; determining a first chroma value and a second chroma value based on reconstructed neighboring chroma samples of the chroma block, wherein the first chroma value and the second chroma value are respectively associated with the max luma value and min luma value; deriving, parameters of a linear model (LM) based on the max luma value and the min luma value and the first chroma value and the second chroma value; and generating predicted chroma values of the chroma block based on the parameters of the LM and the down-sampled luma block.

Optionally, in any of the preceding aspects, another implementation of the aspect provides, wherein the max luma value is determined based on values of one or more first down-sampled samples that are larger than values of rest of the first down-sampled samples; or the min luma value is obtained based on values of one or more first down-sampled samples that are smaller than values of rest of the first down-sampled samples; or the max luma value is determined based on values of one or more second down-sampled samples that are larger than values of rest of the second down-sampled samples; or the min luma value is obtained based on values of one or more second down-sampled samples that are smaller than values of rest of the second down-sampled samples.

Optionally, in any of the preceding aspects, another implementation of the aspect provides, wherein the first chroma value is determined based on values of one or more reconstructed neighboring chroma samples, wherein the one or more reconstructed neighboring chroma samples corresponds to the one or more first down-sampled samples whose values are larger than values of rest of the first down-sampled samples, and/or the second chroma value is determined based on values of one or more reconstructed neighboring chroma samples, wherein the one or more reconstructed neighboring chroma samples correspond to the one or more first down-sampled samples whose values are smaller than values of rest of the first down-sampled samples.

Optionally, in any of the preceding aspects, another implementation of the aspect provides, wherein the first chroma value is determined based on values of one or more reconstructed neighboring chroma samples, wherein the one or more reconstructed neighboring chroma samples corresponds to the one or more second down-sampled samples whose values are larger than values of rest of the second down-sampled samples, and/or the second chroma value is determined based on values of one or more reconstructed neighboring chroma samples, wherein the one or more reconstructed neighboring chroma samples correspond to the one or more second down-sampled samples whose values are smaller than values of rest of the second down-sampled samples.

Optionally, in any of the preceding aspects, another implementation of the aspect provides, wherein the determining a first chroma value and a second chroma value based on reconstructed neighboring chroma samples of the chroma block, comprises: determining, from the reconstructed neighboring chroma samples of the chroma block, a first chroma value and a second chroma value respectively corresponding to the max luma value and min luma value.

Optionally, in any of the preceding aspects, another implementation of the aspect provides, wherein the first down-sampled samples are obtained by down-sampling on the reconstructed top neighboring luma samples which are within the single row being adjacent to the reconstructed luma block.

Optionally, in any of the preceding aspects, another implementation of the aspect provides, wherein the second down-sampled samples are obtained by down-sampling on the reconstructed left neighboring luma samples.

Optionally, in any of the preceding aspects, another implementation of the aspect provides, wherein the reconstructed left neighboring luma samples are within N columns which are left to the reconstructed luma block, wherein 0<N<=3 and N is a positive integer.

Optionally, in any of the preceding aspects, another implementation of the aspect provides, wherein the reconstructed left neighboring luma samples are within a single column which are left to the reconstructed luma block.

Optionally, in any of the preceding aspects, another implementation of the aspect provides, wherein the linear model (LM) comprises one or more of the following linear model of: cross-component linear model (CCLM) mode, multi-directional linear model (MDLM) mode, and multiple model linear model (MMLM) mode.

In an embodiment, the disclosure includes a method for cross-component prediction of a block of video data, the method comprising: down-sampling a reconstructed luma block to obtain a down-sampled luma block, the reconstructed luma block corresponding to a chroma block; determining a max luma value and a min luma value based on first down-sampled samples of reconstructed top neighboring luma samples that are above the reconstructed luma block and second down-sampled samples of reconstructed left neighboring luma samples that are left to the reconstructed luma block, wherein the reconstructed top neighboring luma samples are within a single row being adjacent to the reconstructed luma block; determining a first chroma value and a second chroma value based on reconstructed neighboring chroma samples of the chroma block, wherein the first chroma value and the second chroma value are respectively associated with the max luma value and min luma value; deriving, parameters of a linear model (LM) based on the max luma value and the min luma value and the first chroma value and the second chroma value; and generating predicted chroma values of the chroma block based on the parameters of the LM and the down-sampled luma block.

Optionally, in any of the preceding aspects, another implementation of the aspect provides, wherein the max luma value is determined based on values of one or more first and second down-sampled samples that are larger than values of rest of the first and second down-sampled samples; or the min luma value is determined based on values of one or more first and second down-sampled samples that are smaller than values of rest of the first and second down-sampled samples.

Optionally, in any of the preceding aspects, another implementation of the aspect provides, wherein the first chroma value is determined based on values of one or more reconstructed neighboring chroma samples, wherein the one or more reconstructed neighboring chroma samples corresponds to the one or more first and second down-sampled samples whose values are larger than values of rest of the first and second down-sampled samples, or the second chroma value is determined based on values of one or more reconstructed neighboring chroma samples, wherein the one or more reconstructed neighboring chroma samples correspond to the one or more first and second down-sampled samples whose values are smaller than values of rest of the first and second down-sampled samples.

Optionally, in any of the preceding aspects, another implementation of the aspect provides, wherein the determining a first chroma value and a second chroma value based on reconstructed neighboring chroma samples of the chroma block, comprises: determining, from the reconstructed neighboring chroma samples of the chroma block, a first chroma value and a second chroma value respectively corresponding to the max luma value and min luma value.

Optionally, in any of the preceding aspects, another implementation of the aspect provides, wherein the first down-sampled samples are obtained by down-sampling on the reconstructed top neighboring luma samples which are within a single row being adjacent to the reconstructed luma block.

Optionally, in any of the preceding aspects, another implementation of the aspect provides, wherein the second down-sampled samples are obtained by down-sampling on the reconstructed left neighboring luma samples.

Optionally, in any of the preceding aspects, another implementation of the aspect provides, wherein the reconstructed left neighboring luma samples are within N columns which are left to the reconstructed luma block, wherein 0<N<=3 and N is a positive integer.

Optionally, in any of the preceding aspects, another implementation of the aspect provides, wherein the reconstructed left neighboring luma samples are within a single column which are left to the reconstructed luma block.

Optionally, in any of the preceding aspects, another implementation of the aspect provides, wherein the linear model (LM) comprises one or more of the following linear model of: cross-component linear model (CCLM) mode, multi-directional linear model (MDLM) mode, and multiple model linear model (MMLM) mode.

In an embodiment, the disclosure includes an apparatus for cross-component prediction of a block of video data, the apparatus comprising: a processor and a memory with stored instructions which when executed by the processor cause the processor to: down-sample a reconstructed luma block to obtain a down-sampled luma block, the reconstructed luma block corresponding to a chroma block; obtain first down-sampled samples of reconstructed top neighboring luma samples that are above the reconstructed luma block or second down-sampled samples of reconstructed left neighboring luma samples that are left to the reconstructed luma block, wherein the reconstructed top neighboring luma samples are within a single row being adjacent to the reconstructed luma block; derive, parameters of a linear model (LM), based on the first or second down-sampled samples and reconstructed neighboring chroma samples that are above the chroma block or reconstructed neighboring chroma samples that are left to the chroma block; and generate predicted chroma values of the chroma block based on the parameters of the LM and the down-sampled luma block.

In an embodiment, the disclosure includes an apparatus for cross-component prediction of a block of video data, the apparatus comprising: a processor and a memory with stored instructions which when executed by the processor cause the processor to: down-sample a reconstructed luma block to obtain a down-sampled luma block, the reconstructed luma block corresponding to a chroma block; obtain first down-sampled samples of reconstructed top neighboring luma samples that are above (immediately above) the reconstructed luma block and second down-sampled samples of reconstructed left neighboring luma samples that are left to the reconstructed luma block, wherein the reconstructed top neighboring luma samples are within a single row being adjacent to the reconstructed luma block; derive, parameters of a linear model (LM), based on the first down-sampled samples and the second down-sampled samples, and reconstructed neighboring chroma samples that are above the chroma block and reconstructed neighboring chroma samples that are left to the chroma block; and generate predicted chroma values of the chroma block based on the parameters of the LM and the down-sampled luma block.

Optionally, in any of the preceding aspects, another implementation of the aspect provides, wherein the first down-sampled luma samples are obtained by down-sampling on the reconstructed top neighboring luma samples being within the single row.

Optionally, in any of the preceding aspects, another implementation of the aspect provides, wherein the second down-sampled luma samples are obtained by down-sampling on the reconstructed left neighboring luma samples.

Optionally, in any of the preceding aspects, another implementation of the aspect provides, wherein the reconstructed left neighboring luma samples are within N columns which are left to the reconstructed luma block, wherein 0<N<=3 and N is a positive integer.

Optionally, in any of the preceding aspects, another implementation of the aspect provides, wherein the reconstructed left neighboring luma samples are within a single column which is left (immediately left) to the reconstructed luma block.

Optionally, in any of the preceding aspects, another implementation of the aspect provides, wherein the linear model (LM) comprises one or more of the following linear model of: cross-component linear model (CCLM) mode, multi-directional linear model (MDLM) mode, and multiple model linear model (MMLM) mode.

In an embodiment, the disclosure includes an apparatus for cross-component prediction of a block of video data, the apparatus comprising: a processor and a memory with stored instructions which when executed by the processor cause the processor to: down-sample a reconstructed luma block to obtain a down-sampled luma block, the reconstructed luma block corresponding to a chroma block; determine a max luma value and a min luma value based on first down-sampled samples of reconstructed top neighboring luma samples that are above the reconstructed luma block or second down-sampled samples of reconstructed left neighboring luma samples that are left to the reconstructed luma block, wherein the reconstructed top neighboring luma samples are within a single row being adjacent to the reconstructed luma block; determine a first chroma value and a second chroma value based on reconstructed neighboring chroma samples of the chroma block, wherein the first chroma value and the second chroma value are respectively associated with the max luma value and min luma value; derive, parameters of a linear model (LM) based on the max luma value and the min luma value and the first chroma value and the second chroma value; and generate predicted chroma values of the chroma block based on the parameters of the LM and the down-sampled luma block.

Optionally, in any of the preceding aspects, another implementation of the aspect provides, wherein the max luma value is determined based on values of one or more first down-sampled samples that are larger than values of rest of the first down-sampled samples; or the min luma value is obtained based on values of one or more first down-sampled samples that are smaller than values of rest of the first down-sampled samples; or, the max luma value is determined based on values of one or more second down-sampled samples that are larger than values of rest of the second down-sampled samples; or the min luma value is obtained based on values of one or more second down-sampled samples that are smaller than values of rest of the second down-sampled samples.

Optionally, in any of the preceding aspects, another implementation of the aspect provides, wherein the first chroma value is determined based on values of one or more reconstructed neighboring chroma samples, wherein the one or more reconstructed neighboring chroma samples corresponds to the one or more first down-sampled samples whose values are larger than values of rest of the first down-sampled samples, and/or the second chroma value is determined based on values of one or more reconstructed neighboring chroma samples, wherein the one or more reconstructed neighboring chroma samples correspond to the one or more first down-sampled samples whose values are smaller than values of rest of the first down-sampled samples.

Optionally, in any of the preceding aspects, another implementation of the aspect provides, wherein the first chroma value is determined based on values of one or more reconstructed neighboring chroma samples, wherein the one or more reconstructed neighboring chroma samples corresponds to the one or more second down-sampled samples whose values are larger than values of rest of the second down-sampled samples, and/or the second chroma value is determined based on values of one or more reconstructed neighboring chroma samples, wherein the one or more reconstructed neighboring chroma samples correspond to the one or more second down-sampled samples whose values are smaller than values of rest of the second down-sampled samples.

Optionally, in any of the preceding aspects, another implementation of the aspect provides, wherein the determine a first chroma value and a second chroma value based on reconstructed neighboring chroma samples of the chroma block, comprises: determine, from the reconstructed neighboring chroma samples of the chroma block, a first chroma value and a second chroma value respectively corresponding to the max luma value and min luma value.

Optionally, in any of the preceding aspects, another implementation of the aspect provides, wherein the first down-sampled samples are obtained by down-sampling on the reconstructed top neighboring luma samples which are within the single row being adjacent to the reconstructed luma block.

Optionally, in any of the preceding aspects, another implementation of the aspect provides, wherein the second down-sampled samples are obtained by down-sampling on the reconstructed left neighboring luma samples.

Optionally, in any of the preceding aspects, another implementation of the aspect provides, wherein the reconstructed left neighboring luma samples are within N columns which are left to the reconstructed luma block, wherein $0<N<=3$ and N is a positive integer.

Optionally, in any of the preceding aspects, another implementation of the aspect provides, wherein the reconstructed left neighboring luma samples are within a single column which are left to the reconstructed luma block.

Optionally, in any of the preceding aspects, another implementation of the aspect provides, wherein the linear model (LM) comprises one or more of the following linear model of: cross-component linear model (CCLM) mode, multi-directional linear model (MDLM) mode, and multiple model linear model (MMLM) mode.

In an embodiment, the disclosure includes an apparatus for cross-component prediction of a block of video data, the apparatus comprising: a processor and a memory with stored instructions which when executed by the processor cause the processor to: down-sample a reconstructed luma block to obtain a down-sampled luma block, the reconstructed luma block corresponding to a chroma block; determine a max luma value and a min luma value based on first down-sampled samples of reconstructed top neighboring luma samples that are above the reconstructed luma block and second down-sampled samples of reconstructed left neighboring luma samples that are left to the reconstructed luma block, wherein the reconstructed top neighboring luma samples are within a single row being adjacent to the reconstructed luma block; determine a first chroma value and a second chroma value based on reconstructed neighboring chroma samples of the chroma block, wherein the first chroma value and the second chroma value are respectively associated with the max luma value and min luma value; derive, parameters of a linear model (LM) based on the max luma value and the min luma value and the first chroma value and the second chroma value; and generate predicted chroma values of the chroma block based on the parameters of the LM and the down-sampled luma block.

Optionally, in any of the preceding aspects, another implementation of the aspect provides, wherein the max luma value is determined based on values of one or more first and second down-sampled samples that are larger than values of rest of the first and second down-sampled samples; or the min luma value is determined based on values of one or more first and second down-sampled samples that are smaller than values of rest of the first and second down-sampled samples.

Optionally, in any of the preceding aspects, another implementation of the aspect provides, wherein the first chroma value is determined based on values of one or more reconstructed neighboring chroma samples, wherein the one or more reconstructed neighboring chroma samples corresponds to the one or more first and second down-sampled samples whose values are larger than values of rest of the first and second down-sampled samples, or the second chroma value is determined based on values of one or more reconstructed neighboring chroma samples, wherein the one or more reconstructed neighboring chroma samples correspond to the one or more first and second down-sampled samples whose values are smaller than values of rest of the first and second down-sampled samples.

Optionally, in any of the preceding aspects, another implementation of the aspect provides, wherein the determine a first chroma value and a second chroma value based on reconstructed neighboring chroma samples of the chroma block, comprises: determine, from the reconstructed neighboring chroma samples of the chroma block, a first chroma value and a second chroma value respectively corresponding to the max luma value and min luma value.

Optionally, in any of the preceding aspects, another implementation of the aspect provides, wherein the first down-sampled samples are obtained by down-sampling on the reconstructed top neighboring luma samples which are within a single row being adjacent to the reconstructed luma block.

Optionally, in any of the preceding aspects, another implementation of the aspect provides, wherein the second down-sampled samples are obtained by down-sampling on the reconstructed left neighboring luma samples.

Optionally, in any of the preceding aspects, another implementation of the aspect provides, wherein the reconstructed left neighboring luma samples are within N columns which are left to the reconstructed luma block, wherein $0<N<=3$ and N is a positive integer.

Optionally, in any of the preceding aspects, another implementation of the aspect provides, wherein the reconstructed left neighboring luma samples are within a single column which are left to the reconstructed luma block.

Optionally, in any of the preceding aspects, another implementation of the aspect provides, wherein the linear model (LM) comprises one or more of the following linear model of: cross-component linear model (CCLM) mode, multi-directional linear model (MDLM) mode, and multiple model linear model (MMLM) mode.

In an embodiment, the disclosure includes an electronic device for coding/decoding video data, the electronic device comprising one or more processing units configured to perform any one of the preceding aspects.

In an embodiment, the disclosure includes a computer readable medium storing instructions which when executed on a processor cause the processor to perform the method according to any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
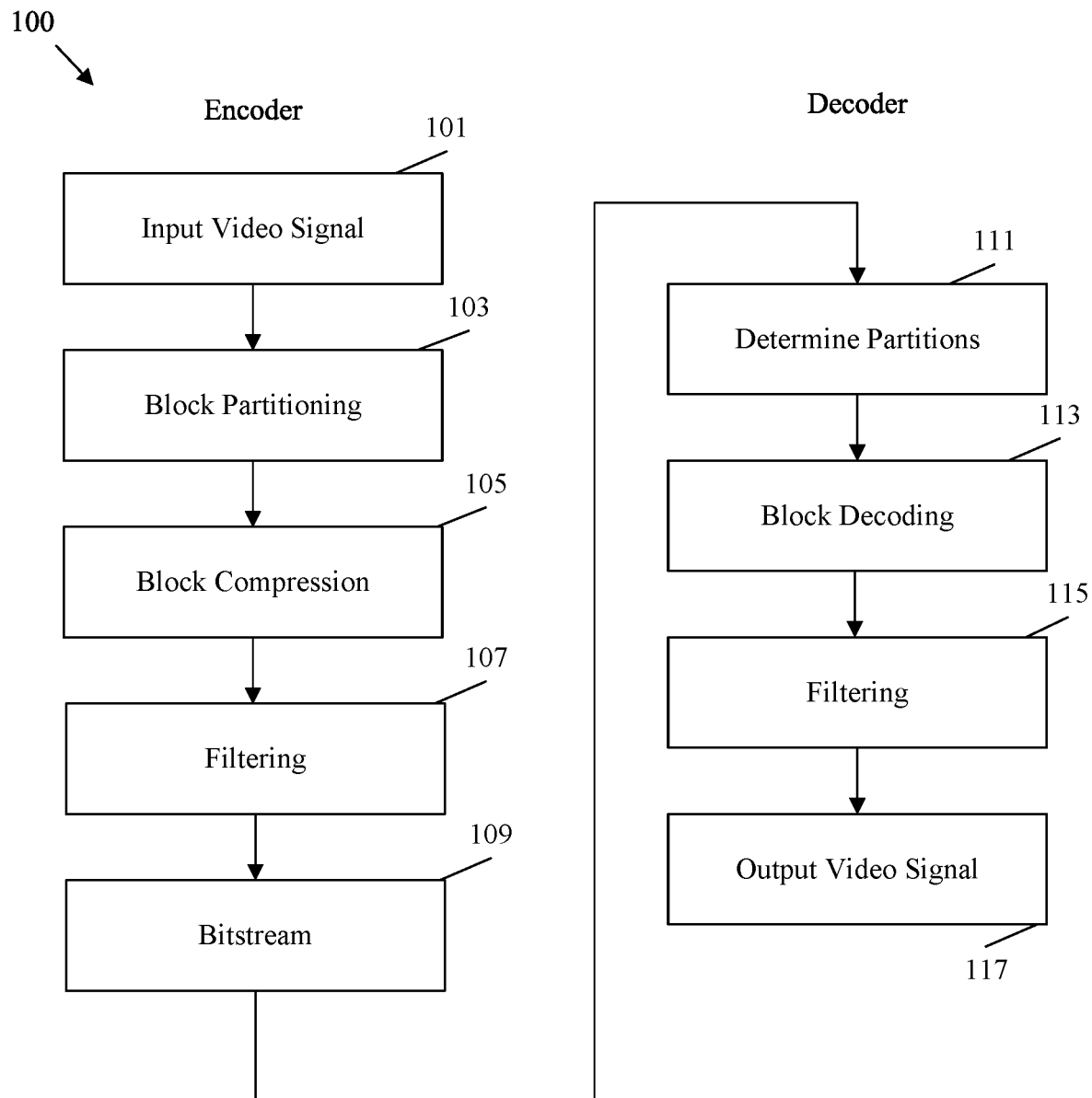
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video coding includes partitioning video frames into blocks and encoding the blocks via intra-prediction and inter-prediction to compress the size of a video file. Specifically, the video frames can be partitioned into coding units (CUs) that contain luma coding blocks (CBs) and chroma CBs (light values and color values, respectively). Prediction (intra or inter) can then be applied to determine reference blocks for the coding blocks. Prediction results in prediction information that codes the CBs by reference to the reference block(s). Samples (e.g., pixels) of the CBs are compared to samples of the reference block(s) and differences in values are maintained as residual samples. Intra-prediction selects reference blocks in the same frame as the current block, while inter-prediction selects reference blocks in different frames from the current block. In most cases, intra-prediction modes employ reference luma blocks to predict luma blocks and reference chroma blocks to predict chroma blocks. Cross-component modes may also be used. In cross-component intra-prediction, luma reference samples are employed to predict chroma samples in a current block.

The present disclosure relates to improvements in the process of performing cross-component intra-prediction. Specifically, a luma block generally contains four times the number of samples of a corresponding chroma block. As such, the luma reference blocks are down-sampled to match the resolution of the chroma block to support accurate cross-component intra-prediction. Down-sampling is the process of reducing the resolution of a group of pixel samples. Certain mechanisms of down-sampling use significant memory resources without providing significant benefits in accuracy. Specifically, certain down-sampling mechanisms use multiple rows and columns of reference samples to generate a single row/column of down-sampled reference samples for use in cross-component intra-prediction.

Disclosed herein are improved down-sampling mechanisms to support increased efficiency of cross-component intra-prediction. Cross-component intra-prediction may include CCLM mode intra-prediction, MDLM mode intra-prediction, and/or MMLM mode intra-prediction. To perform such intra-prediction, luma samples in the same CU and luma samples and chroma samples from neighboring CBs are used as reference samples to predict chroma samples in a current block. In the present disclosure, a single row and/or a single column of neighboring reference samples can be used during down-sampling to create a single row and/or column of down-sampled neighboring reference samples. The resulting down-sampled neighboring reference samples are generally as accurate as reference samples down-sampled from multiple rows/columns. However, using a single row and/or column for down-sampling significantly reduces the amount of line buffer memory used for the intra-prediction process. Accordingly, using a single row and/or column for down-sampling the neighboring luma reference samples decreases resource usage without significantly reducing the coding efficiency of the cross-component intra-prediction mechanisms.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty four pixels by sixty four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code word is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, deblocking filters, adaptive loop filters, and SAO filters may be applied to the frames to remove blocking artifacts. Once the frames are filtered, the video signal can be output to a display at step 117 for viewing by an end user.

The present disclosure relates to modifications to downsampling mechanisms to support intra-prediction to reduce resource usage without significantly reducing accuracy, and hence coding efficiency when compressing blocks. Hence, the present disclosure improves the functionality of block compression at step 105 at the encoder and block decoding at step 113 at the decoder. Specifically, at steps 105 and 113, a single row of luma samples are down-sampled and then employed for cross-component intra-prediction.

Figure 2:
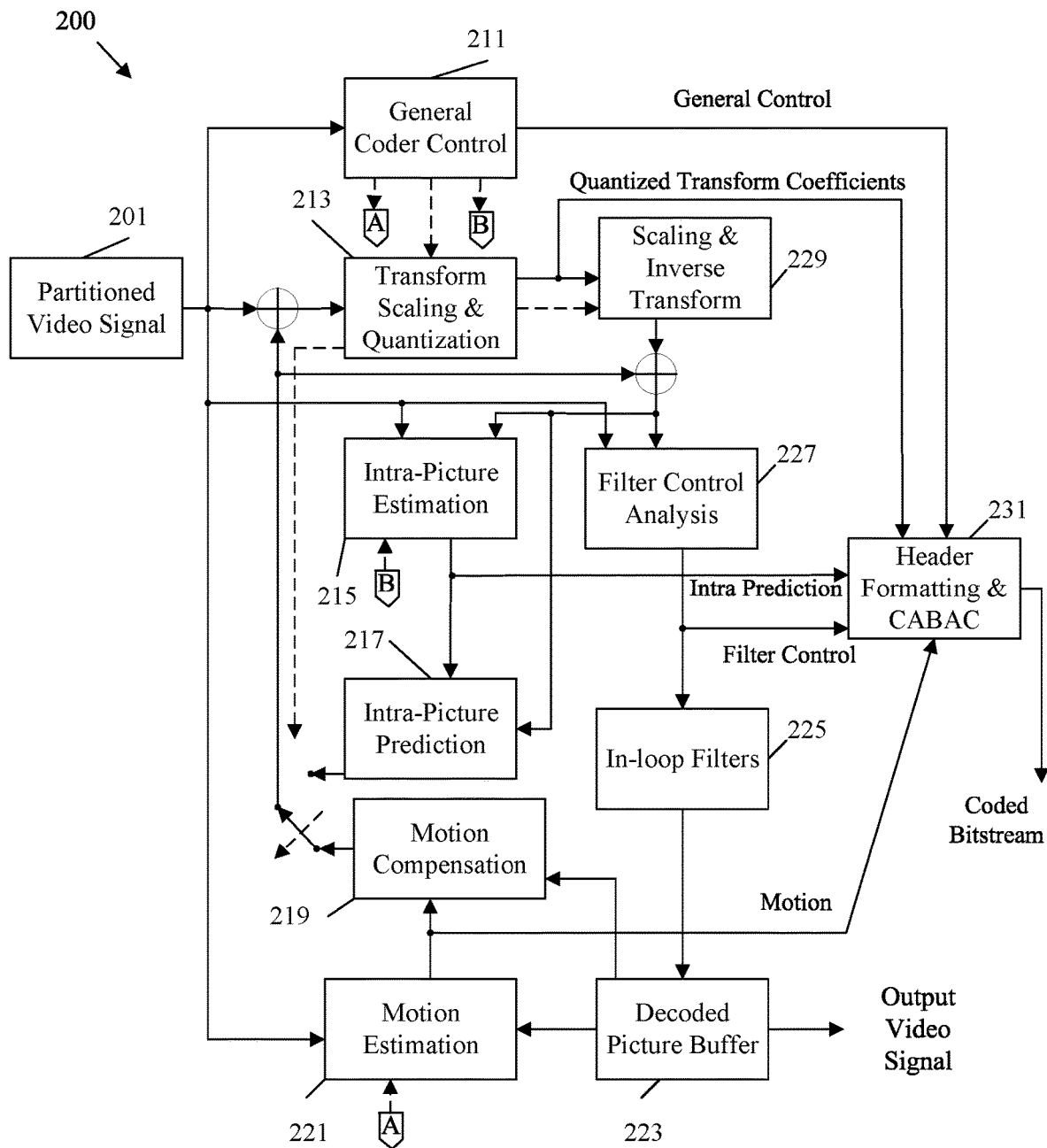
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or one or more transform unit (TUs) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as code word mapping tables), definitions of encoding contexts for various blocks, indications of most probable intra-prediction modes, an indication of partition information, etc. Such data may be encoded be employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

The present disclosure relates to modifications to down-sampling mechanisms to support intra-prediction to reduce resource usage without significantly reducing accuracy, and hence coding efficiency when compressing blocks. For example, the present disclosure improves the functionality of intra-picture estimation component 215 and/or intra-picture prediction component 217. Specifically, the intra-picture estimation component 215 and/or intra-picture prediction component 217 obtain neighboring blocks of luma samples as part of predicting a current block of chroma samples. The intra-picture estimation component 215 and/or intra-picture prediction component 217 may then down-sample the luma samples from the neighboring blocks for use as reference samples when performing cross-component intra-prediction. Further, the intra-picture estimation component 215 and/or intra-picture prediction component 217 use a single column and/or row when down-sampling to reduce line buffer memory usage without significantly reducing accuracy of the intra-prediction process.

Figure 3:
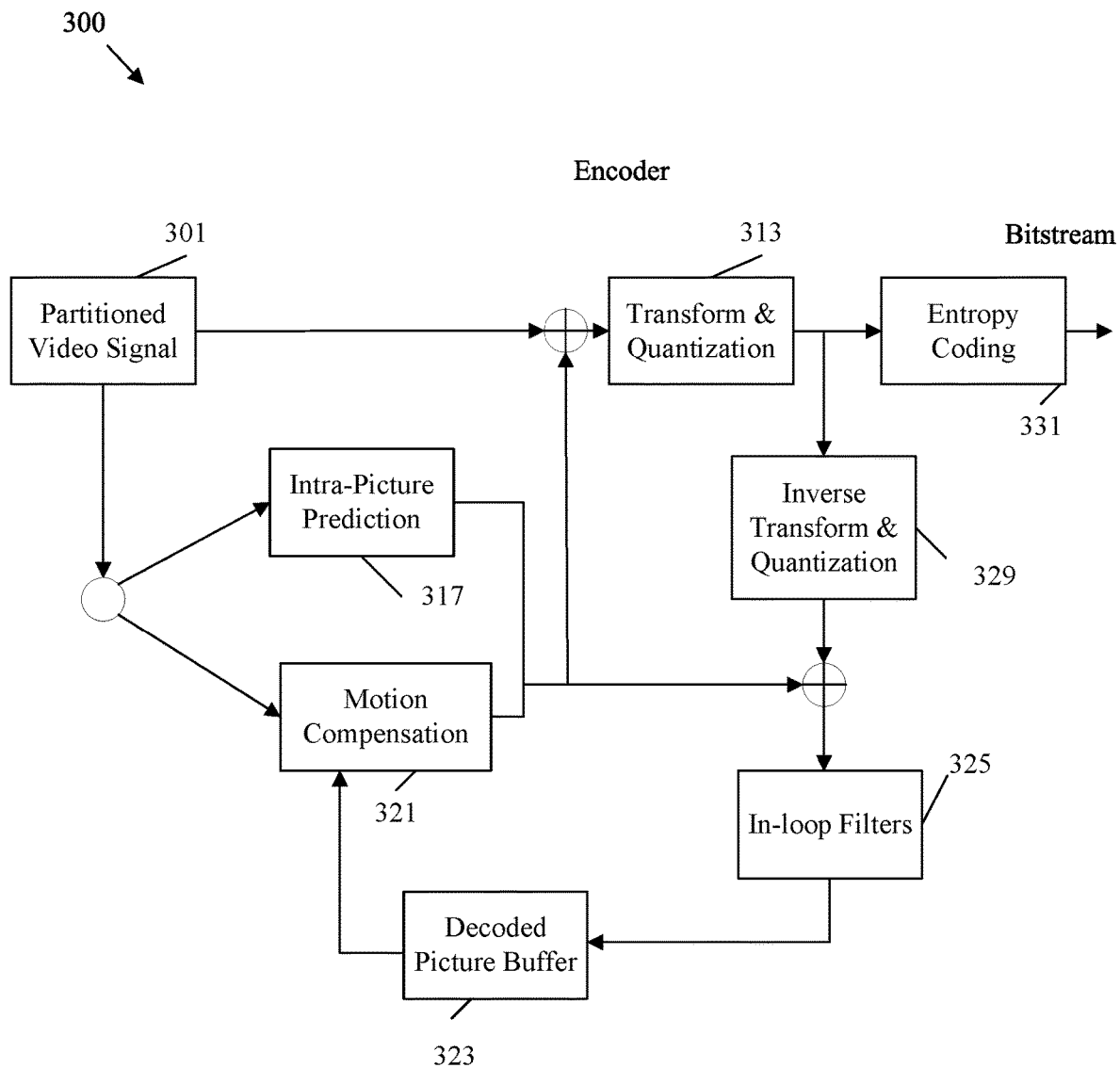
FIG. 3 is a schematic diagram illustrating an example video encoder that may perform cross-component intra-prediction.

FIG. 3 is a block diagram illustrating an example video encoder 300 that may perform cross-component intra-prediction. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transformation and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

For example, the intra-picture prediction component 317 can be configured to perform cross-component intra-prediction. In cross-component intra-prediction, the chroma components for a current block are predicted based in part on the luma components of neighboring blocks. In an encoder 300, the neighboring blocks may be encoded and then later reconstructed to act as reference blocks for further blocks. Hence, the chroma components of the current block are predicted based on reconstructed neighboring luma samples from reconstructed neighboring blocks. Multiple cross-component mechanisms are discussed in greater detail below. Regardless of the cross-component mechanisms used, the neighboring luma components are down-sampled. This is because luma blocks are generally at four times the resolution of chroma blocks, and hence contain four times the number of samples of the chroma blocks. Down-sampling allows the number of reference luma samples to match the number of chroma samples to provide for an accurate comparison when performing cross-component intra-prediction.

The intra-picture prediction component 317 performs down-sampling by employing a single row and/or a single column of luma samples from the neighboring reference blocks. By way of comparison, employing multiple rows and columns of luma samples during down-sampling results in down-sampled luma reference samples that are not significantly different than the down-sampled luma reference samples from a single line/column. However, the down-sampled luma reference samples from multiple rows/lines employ significantly more line buffer memory space to generate than the down-sampled luma reference samples from a single line/row. Accordingly, by employing a single row/column of luma samples for down-sampling when determining neighboring luma reference samples, the amount of line buffer memory space is significantly reduced without significantly impacting the accuracy of the resulting down-sampled luma reference samples. As such, the intra-picture prediction component 317 employs fewer memory resources without significantly reducing coding efficiency, which results in improved functionality of the intra-picture prediction component 317.

Figure 4:
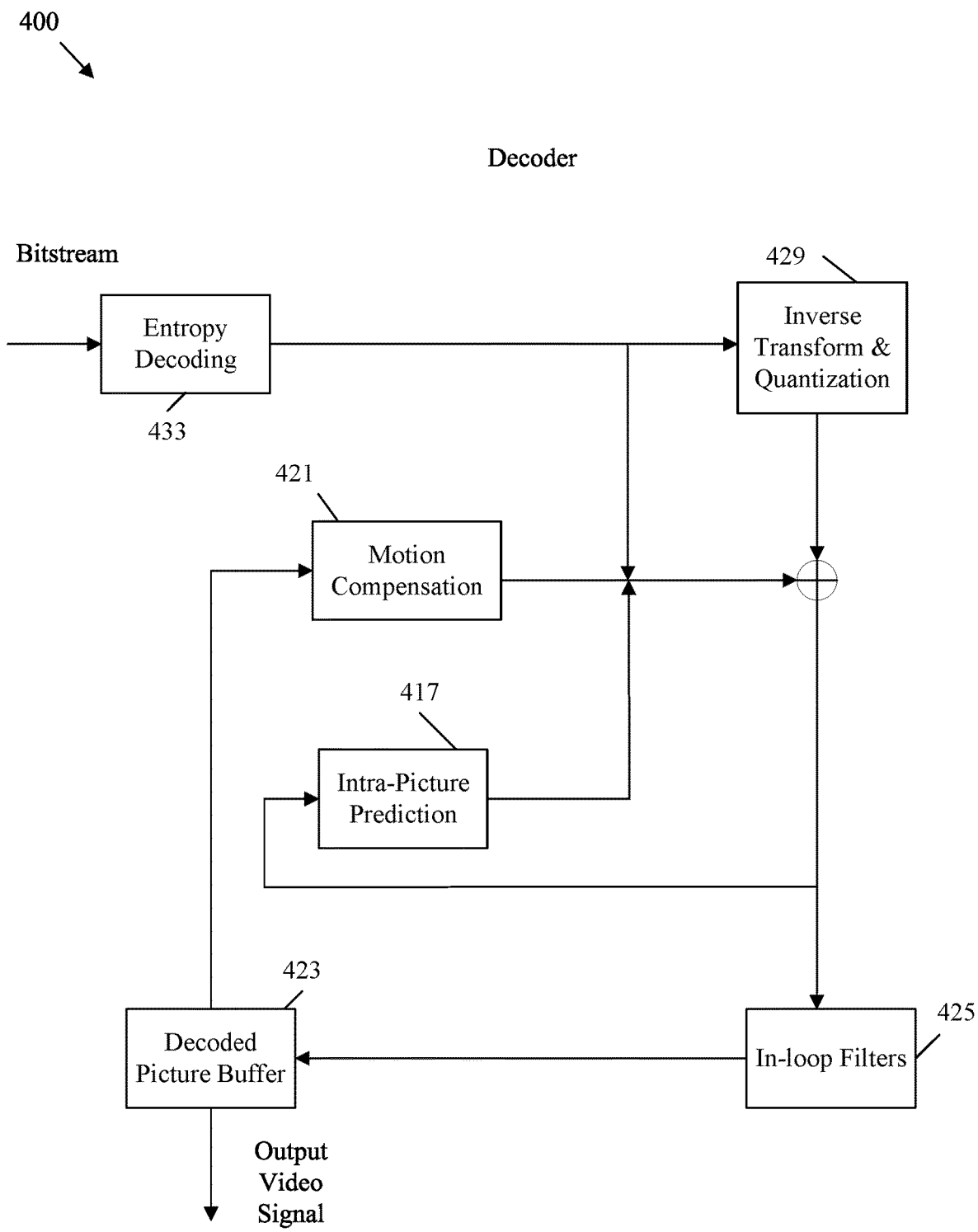
FIG. 4 is a schematic diagram illustrating an example video decoder that may perform cross-component intra-prediction.

FIG. 4 is a block diagram illustrating an example video decoder 400 that may perform cross-component intra-prediction. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as code words in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks, and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

As with encoder 300, the intra-picture prediction component 417 of the decoder 400 can be configured to perform cross-component intra-prediction. In cross-component intra-prediction, the chroma components for a chroma block are predicted based on luma components of a corresponding reconstructed luma block block as well as based on parameters obtained from reconstructed neighboring chroma samples in neighboring chroma blocks and reconstructed neighboring luma samples in the neighboring luma blocks. For example in a decoder 400, the neighboring luma and chroma blocks may be reconstructed and then used as reference blocks for further blocks (e.g., a current block). Hence, the chroma components of the chroma block are in part predicted based on reconstructed neighboring luma samples from reconstructed neighboring luma blocks and reconstructed neighboring chroma samples from reconstructed neighboring chroma blocks. Multiple cross-component mechanisms are discussed in greater detail below. Regardless of the cross-component mechanisms used, the neighboring luma components are down-sampled. This is because luma blocks are generally at 4-times the resolution of chroma blocks, and hence contain 4-times the number of samples of the chroma blocks. Down-sampling allows the number of reference luma samples to match the number of reference chroma samples to provide for an accurate comparison when performing cross-component intra-prediction.

The intra-picture prediction component 417 performs down-sampling by employing a single row and/or a single column of luma samples from the neighboring reference luma blocks. By way of comparison, employing multiple rows and columns of luma samples during down-sampling results in down-sampled neighboring luma reference samples that are not significantly different than the down-sampled neighboring luma reference samples from a single line/column. However, the down-sampled luma reference samples from multiple rows/lines employ significantly more line buffer memory space to generate than the down-sampled luma reference samples from a single line/row. Accordingly, by employing a single row/column of neighboring luma samples for down-sampling, the amount of line buffer memory space is significantly reduced without significantly impacting the accuracy of the resulting down-sampled luma reference samples. As such, the intra-picture prediction component 417 employs fewer memory resources without significantly reducing coding efficiency, which results in improved functionality of the intra-picture prediction component 417.

Figure 5:
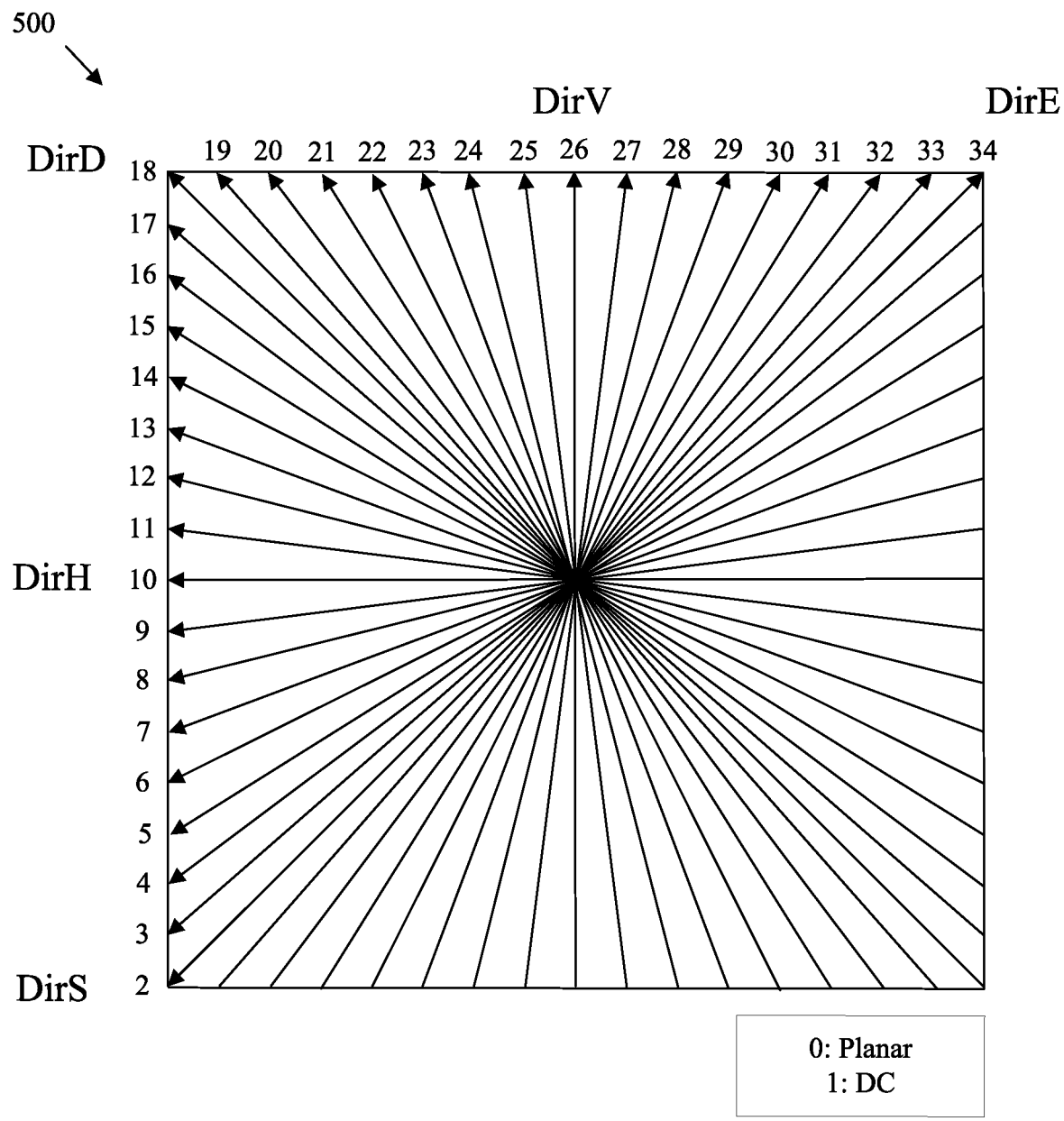
FIG. 5 is a schematic diagram illustrating an example of intra-prediction modes.

FIG. 5 is a schematic diagram illustrating an example of intra-prediction modes 500 as employed in video coding. For example, intra-prediction modes 500 may be employed by steps 105 and 113 of method 100, intra-picture estimation component 215 and an intra-picture prediction component 217 of codec system 200, intra-picture prediction component 317 of encoder 300, and/or intra-picture prediction component 417 of decoder 400.

Intra-prediction involves matching one or more samples in a current block in a CU to one or more reference samples of one or more neighboring blocks. The current block can then be represented as a selected prediction mode index and a residual block, which is much smaller than representing all of the sample values contained in the current block. Intra-prediction can be used when there is no available reference frame, or when inter-predication coding is not used for the current block, slice, and/or frame. The reference samples for intra-prediction are generally derived from neighboring blocks in the same frame. Advanced Video Coding (AVC), also known as H.264, and H.265/HEVC both employ a reference line of boundary samples of adjacent blocks as reference samples for intra-prediction. In order to cover different textures or structural characteristics many different intra-prediction modes 500 are employed. H.265/HEVC supports a total of thirty five single component intra-prediction modes 500 that spatially correlate a current block of samples to one or more reference samples of the same type (e.g., luma samples predicted by reference luma samples and chroma samples predicted by reference chroma samples). Specifically, intra-prediction modes 500 include thirty-three directional prediction modes indexed as modes two through thirty four, a DC mode indexed as mode one, and a planar mode indexed as mode zero.

During encoding, the encoder matches the luma/chroma values of a current block in a CU with the luma/chroma values of corresponding reference samples in a reference line across the edges of neighboring blocks. When the best match is found with one of the reference lines, the encoder selects one of the directional intra-prediction modes 500 that points to the best matching reference line (e.g., smallest difference in sample value(s)). For clarity of discussion, acronyms are employed below to reference particular directional intra-prediction modes 500. DirS denotes the starting directional intra-prediction mode when counting clockwise from the bottom left (e.g., mode two in HEVC). DirE denotes the ending directional intra-prediction mode when counting clockwise from the bottom left (e.g., mode thirty four in HEVC). DirD denotes the middle directional intra-coding mode when counting clockwise from the bottom left (e.g., mode eighteen in HEVC). DirH denotes a horizontal intra-prediction mode (e.g., mode ten in HEVC). DirV denotes a vertical intra-prediction mode (e.g., mode twenty six in HEVC).

DC mode acts as a smoothing function and derives a prediction value of a block in the CU as an average value of all the reference samples in the reference line traversing the neighboring blocks. Planar mode returns a prediction value that indicates a smooth transition (e.g., constant slope of values) between samples at the bottom and top left or top left and top right of the reference line of reference samples.

For planar, DC, and prediction modes from DirH to DirV, the samples in both the top row of the reference line and the left column of the reference line are used as reference samples. For prediction modes with prediction directions from DirS to DirH (including DirS and DirH), the reference samples in the neighboring blocks on the left column of the reference line are used as reference samples. For prediction modes with prediction directions from DirV to DirE (including DirV and DirE), the reference samples of the neighboring blocks on the top row of the reference line are used as reference samples. Accordingly, intra-prediction modes 500 can be used to indicate a spatial and/or directional relationship between samples and one or more reference samples.

Figure 6:
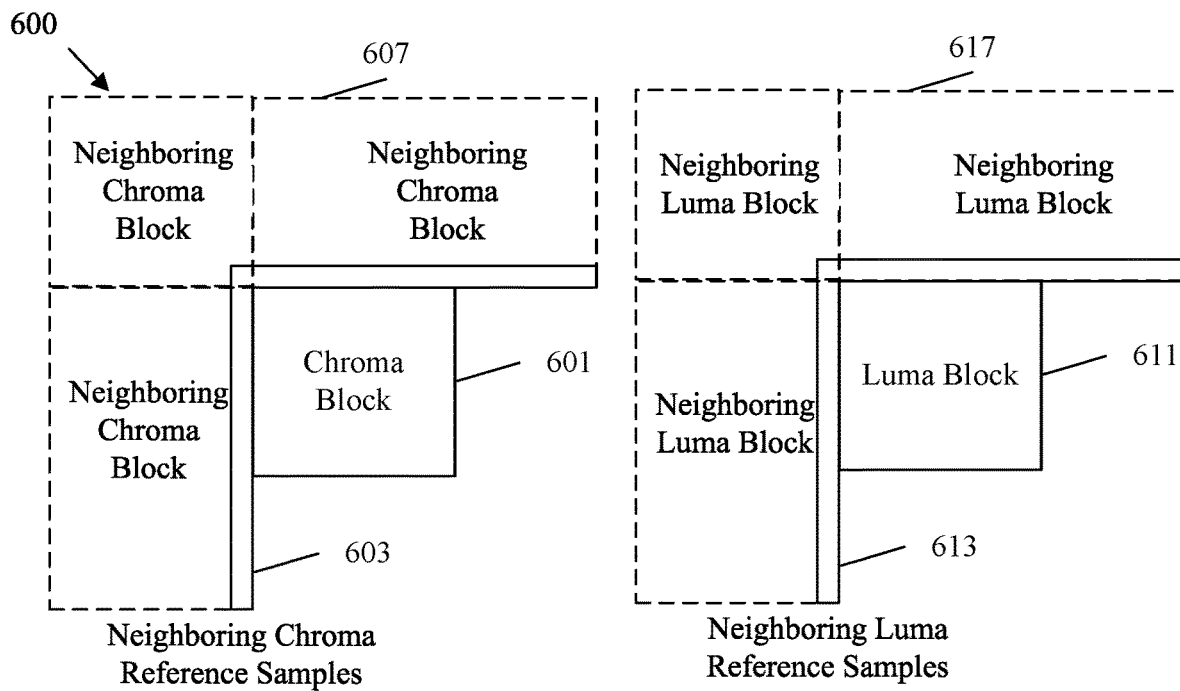
FIG. 6 is a schematic diagram illustrating an example mechanism of performing cross-component intra-prediction.

FIG. 6 is a schematic diagram illustrating an example mechanism of performing cross-component intra-prediction 600. Cross-component intra-prediction 600 may be performed by an intra-picture estimation component 215 and/or an intra-picture prediction component 217 of a codec system 200, an intra-picture prediction component 317 of an encoder 300, and/or an intra-picture prediction component 417 of a decoder 400. Specifically, cross-component intra-prediction 600 can be employed during block compression at step 105 of method 100 and during block decoding at step 113 of method 100 at an encoder and a decoder, respectively. Cross-component intra-prediction 600 operates in a manner that is substantially similar to intra-prediction modes 500. However, cross-component intra-prediction 600 uses luma reference samples to predict chroma samples in order to reduce cross-component redundancy.

Cross-component intra-prediction 600 operates on a chroma block 601 based on reference samples from a corresponding luma block 611 in the same CU, neighboring chroma blocks 607, and neighboring luma blocks 617. Specifically, a CU contains a luma block and two chroma blocks. The chroma block 601 contains chroma samples once reconstructed. The chroma samples may include red difference chroma (Cr) samples, blue difference chroma (Cb) samples, or combinations thereof. The neighboring chroma blocks 607 contain neighboring chroma samples, and the neighboring luma blocks 617 contain neighboring luma samples. A neighboring chroma block 607 is a block of chroma samples that is directly adjacent to the chroma block 601. A neighboring luma block 617 is a block of luma samples that is directly adjacent to the luma block 611. The luma block 611 is positioned in the same location as the chroma block 601, and are rendered together to express both light and color, respectively, in an image. Cross-component intra-prediction 600 operates based on the corresponding luma samples from the luma block 611, the neighboring chroma reference samples 603 in the neighboring chroma blocks 607, and the neighboring luma reference samples 613 in the neighboring luma blocks 617. Specifically, chroma samples in the current block 601 can be predicted by a combination of luma samples in the luma block 611 in the same CU as the current block as well as set(s) of luma samples and chroma samples acting as neighboring reference luma samples 613 and neighboring chroma reference samples 603 in the neighboring luma blocks 607 and in the neighboring chroma blocks 607, respectively. Neighboring chroma reference samples 603 are taken from rows of the neighboring chroma blocks 607 that are directly adjacent to the chroma block 601. Neighboring chroma reference samples 603 are also taken from columns of the neighboring chroma blocks 607 that are directly adjacent to the chroma block 601. Neighboring luma reference samples 613 are taken from rows of the neighboring luma blocks 617 that are directly adjacent to the luma block 611. Neighboring luma reference samples 613 are also taken from columns of the neighboring luma blocks 617 that are directly adjacent to the luma block 611.

Several mechanisms may be employed to predict chroma samples in the current block 601 based on luma samples in the luma blocks 611 using parameters generated based on the neighboring luma reference samples 613 and neighboring chroma reference samples 603 in the neighboring luma blocks 617 and neighboring chroma blocks 607, respec-tively, as discussed in greater detail below. In general, a linear model is created to determine parameters by correlating the chroma samples in the chroma block 601 to the luma samples in the luma block 611 in the same CU and neighboring luma reference samples 613 and neighboring chroma reference samples 603. The model parameters may be calculated by minimizing regression error between the neighboring luma reference samples 613 and neighboring chroma reference samples 603. Another approach involves calculating model parameters based on the minimum and maximum luma values from the neighboring luma reference samples 613. Such computation mechanisms are discussed in detail below.

Figure 7:
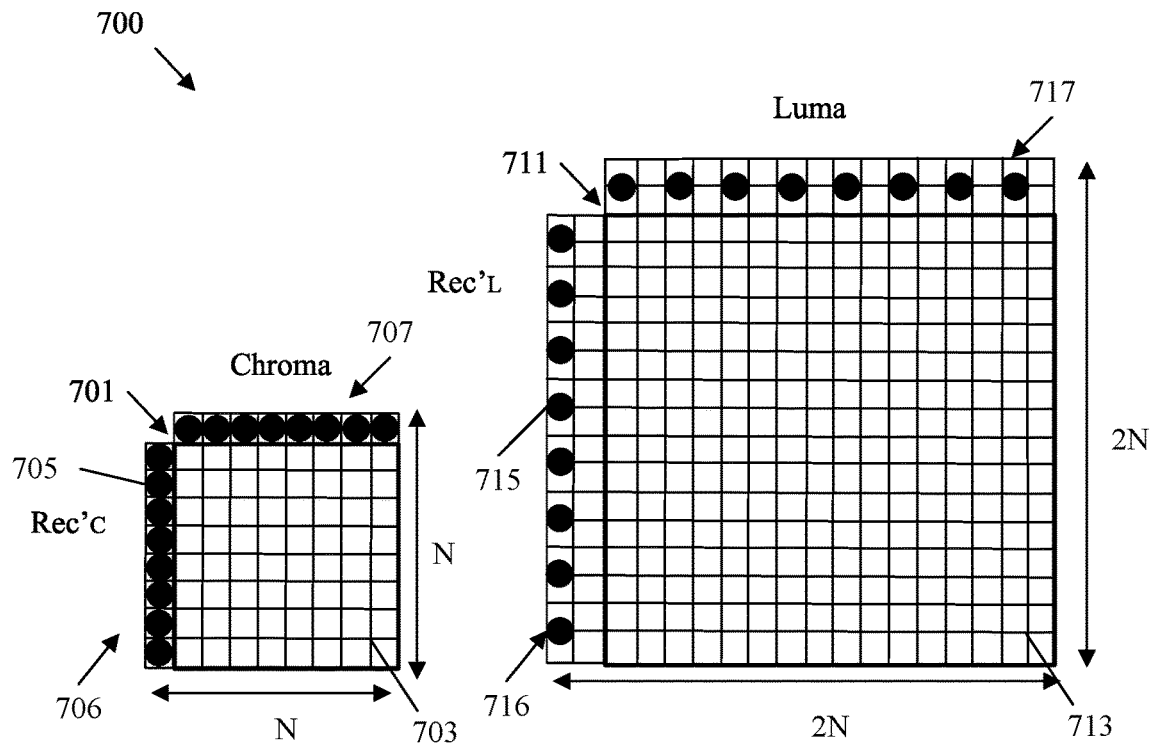
FIG. 7 is a schematic diagram illustrating an example mechanism of performing cross-component linear model (CCLM) intra-prediction.

FIG. 7 is a schematic diagram illustrating an example mechanism of performing CCLM intra-prediction 700. CCLM intra-prediction 700 is a type of cross-component intra-prediction 600. Hence, CCLM intra-prediction 700 may be performed by an intra-picture estimation component 215 and/or an intra-picture prediction component 217 of a codec system 200, an intra-picture prediction component 317 of an encoder 300, and/or an intra-picture prediction component 417 of a decoder 400. Specifically, CCLM intra-prediction 700 can be employed during block compression at step 105 of method 100 and during block decoding at step 113 of method 100 at an encoder and a decoder, respectively.

CCLM intra-prediction 700 predicts chroma samples 703 in a chroma block 701. The chroma samples 703 appear at integer positions shown as intersecting lines. The prediction is based in part on neighboring reference samples, which are depicted as black circles. Unlike with intra-prediction modes 500, the chroma samples 703 are not predicted solely based on the neighboring chroma reference samples 705, which are denoted as reconstructed chroma samples (Rec'C). The chroma samples 703 are also predicted based on luma reference samples 713 and neighboring luma reference samples 715. Specifically, a CU contains a luma block 711 and two chroma blocks 701. A model is generated that correlates the chroma samples 703 and the luma reference samples 713 in the same CU. Linear coefficients for the model are determined by comparing the neighboring luma reference samples 715 to the neighboring chroma reference samples 705.

The luma reference samples 713 are selected from the luma block 711 in the same CU as the chroma block 701. The neighboring luma reference samples 715 are selected from luma samples in neighboring blocks adjacent to the luma block 711. The neighboring luma reference samples 715 are selected by applying a template 717 to the neighboring block above the luma block 711 and applying a template 716 to the neighboring block to the left to the luma block 711. As the luma reference samples 713 are reconstructed, the luma reference samples 713 are denoted as reconstructed luma samples (Rec'L). The neighboring chroma reference samples 705 are selected from chroma samples in neighboring blocks adjacent to the chroma block 701. The neighboring chroma reference samples 705 are selected by applying a template 707 corresponding to template 717 to the neighboring chroma samples in the neighboring chroma block above the chroma block 701 and applying a template 706 corresponding to template 716 to the neighboring chroma samples in the neighboring chroma block to the left to the chroma block 701. As the neighboring chroma reference samples 705 are reconstructed, the neighboring chroma reference samples 705 are denoted as reconstructed chroma samples (Rec'C). Also, as used herein, a template 706, 707, 716, and 717 is a mechanism that correlates neighboring luma reference samples 715 to neighboring chroma reference samples 705.

As shown, the luma block 711 contains four times the samples as the chroma block 701. Specifically, the chroma block 701 contains N number of samples by N number of samples while the luma block 711 contains 2N number of samples by 2N number of samples. Hence, the luma block 711 is four times the resolution of the chroma block 701. For the prediction to operate on the luma reference samples 713 and the neighboring luma reference samples 715, the luma reference samples 713 and the neighboring luma reference samples 715 are down-sampled to provide an accurate comparison with the neighboring chroma reference samples 705 and the chroma samples 703. Down-sampling is the process of reducing the resolution of a group of sample values. For example, when YUV4:2:0 format is used, the luma samples may be down-sampled by a factor of four (e.g., width by two, and height by two). YUV is a color encoding system that employs a color space in terms of luma components Y and two chrominance components U and V.

Once the neighboring luma reference samples 715 and the luma reference samples 713 are down-sampled, a model can be generated to predict the chroma samples 703 of the chroma block 701. Specifically, in CCLM intra-prediction 700, a prediction for chroma samples 703 of the chroma block 701 can be determined according to the model described by equation 1:

$$\text{pred}_C(i,j) = \alpha \cdot \text{rec}_L'(i,j) + \beta \quad (1)$$

where $\text{pred}_C(i,j)$ are the prediction chroma samples 703 of chroma block 701 at a height i and a width j, $\text{rec}_L'(i,j)$ are the reconstructed down-sampled luma reference samples 713 and $\alpha$ and $\beta$ are linear coefficients determined by comparing the neighboring down-sampled luma reference samples 715 and the chroma reference samples 705.

In one example, $\alpha$ and $\beta$ are determined by minimizing the regression error between the down-sampled neighboring luma reference samples 715 and the chroma reference samples 705. This can be done according to equations 2 and 3:

$$\alpha = \frac{N \cdot \Sigma(L(n) \cdot C(n)) - \Sigma L(n) \cdot \Sigma C(n)}{N \cdot \Sigma(L(n) \cdot L(n)) - \Sigma L(n) \cdot \Sigma L(n)} \quad (2)$$

$$\beta = \frac{\Sigma C(n) - \alpha \cdot \Sigma L(n)}{N} \quad (3)$$

where L(n) represents the down-sampled top and left neighboring reconstructed luma samples (e.g., down-sampled neighboring luma reference samples 715), C(n) represents the top and left neighboring reconstructed chroma samples (e.g., the neighboring chroma reference samples 705), and value of N is equal to the sum of the width and height of the current chroma coding block (e.g., chroma block 701). In another example, $\alpha$ and $\beta$ are determined based on the minimum and maximum value of the down-sampled neighboring luma reference samples 715 as discussed with respect to FIG. 8 below.

As noted above, the neighboring luma reference samples 715 and the luma reference samples 713 are down-sampled prior to generating the linear model. Further, employing multiple lines and columns to generate the neighboring luma reference samples 715 does not significantly increase the accuracy of the remaining calculations pursuant to CCLM intra-prediction 700. As such, a single row and/or column of neighboring luma reference samples 715 can be employed during down-sampling, which reduces utilization of the line buffer memory without significantly impacting the accuracy and/or coding efficiency of CCLM intra-prediction 700.

Figure 8:
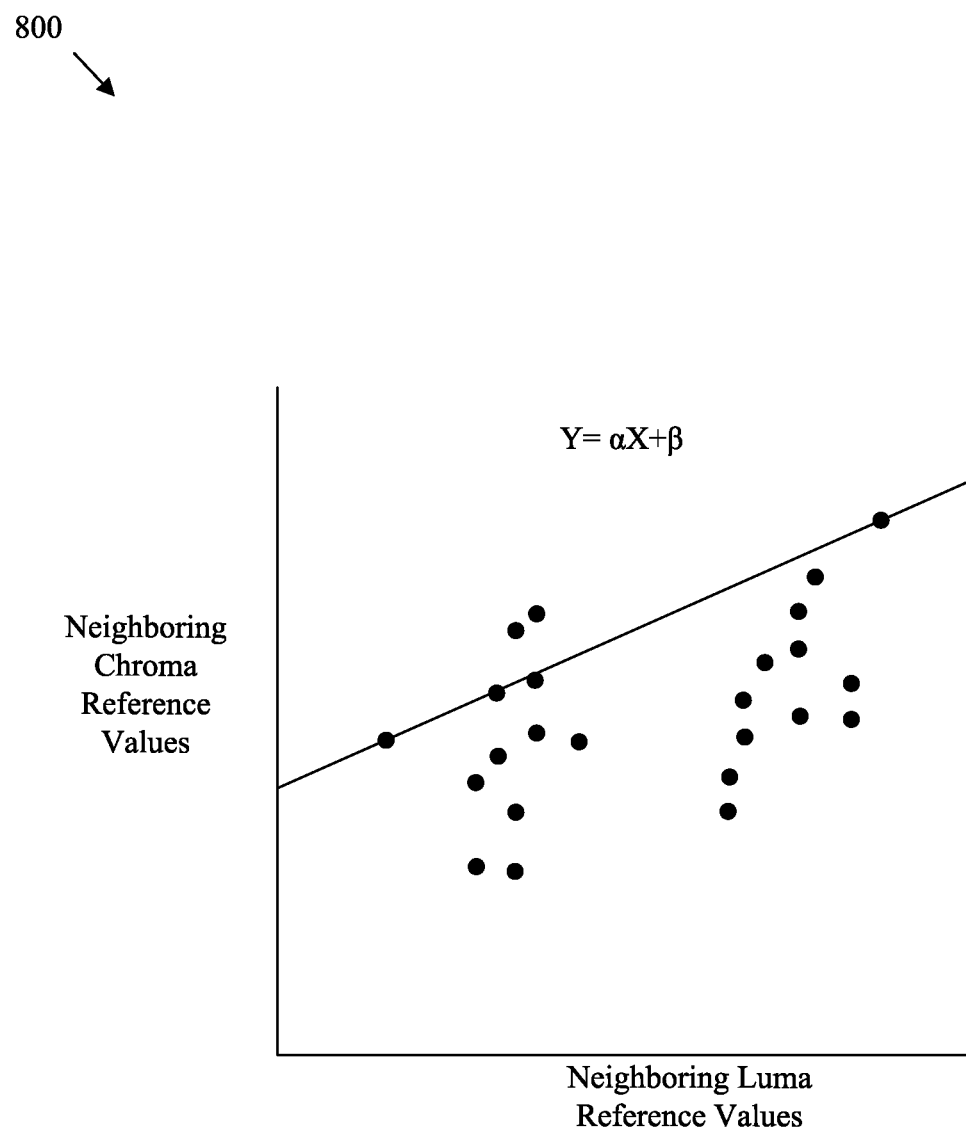
FIG. 8 is a graph illustrating an example mechanism of determining linear model parameters to support CCLM intra-prediction.

FIG. 8 is a graph illustrating an example mechanism 800 of determining linear model parameters to support CCLM intra-prediction 700. In mechanism 800, $\alpha$ and $\beta$, as used in equation 1, are determined based on the minimum and maximum value of the down-sampled neighboring luma reference samples. This is an alternate approach to determining $\alpha$ and $\beta$ based on minimizing the regression error.

Neighboring luma reference values can be compared to corresponding neighboring chroma reference values on a graph as shown. A line can be drawn through the point containing the minimum neighboring luma reference value and the maximum neighboring luma reference value. Such a line can be characterized as $Y = \alpha \cdot X + \beta$. The slope $\alpha$ and the Y intercept $\beta$ can be determined based on two points according to equations 4 and 5.

$$\alpha = \frac{y_B - y_A}{x_B - x_A} \quad (4)$$

$$\beta = y_A - \alpha x_A \quad (5)$$

where $(x_A, y_A)$ is a coordinate defined by the minimum neighboring luma reference value and a corresponding chroma reference value and $(x_B, y_B)$ is a coordinate defined by the maximum neighboring luma reference value and a corresponding chroma reference value. Hence, $\alpha$ and $\beta$ can be determined based on a line passing through the minimum and maximum value of the down-sampled neighboring luma reference samples. The $\alpha$ and $\beta$ can then be used in equation 1 to determine the prediction values for the chroma samples in the current block.

Figure 9:
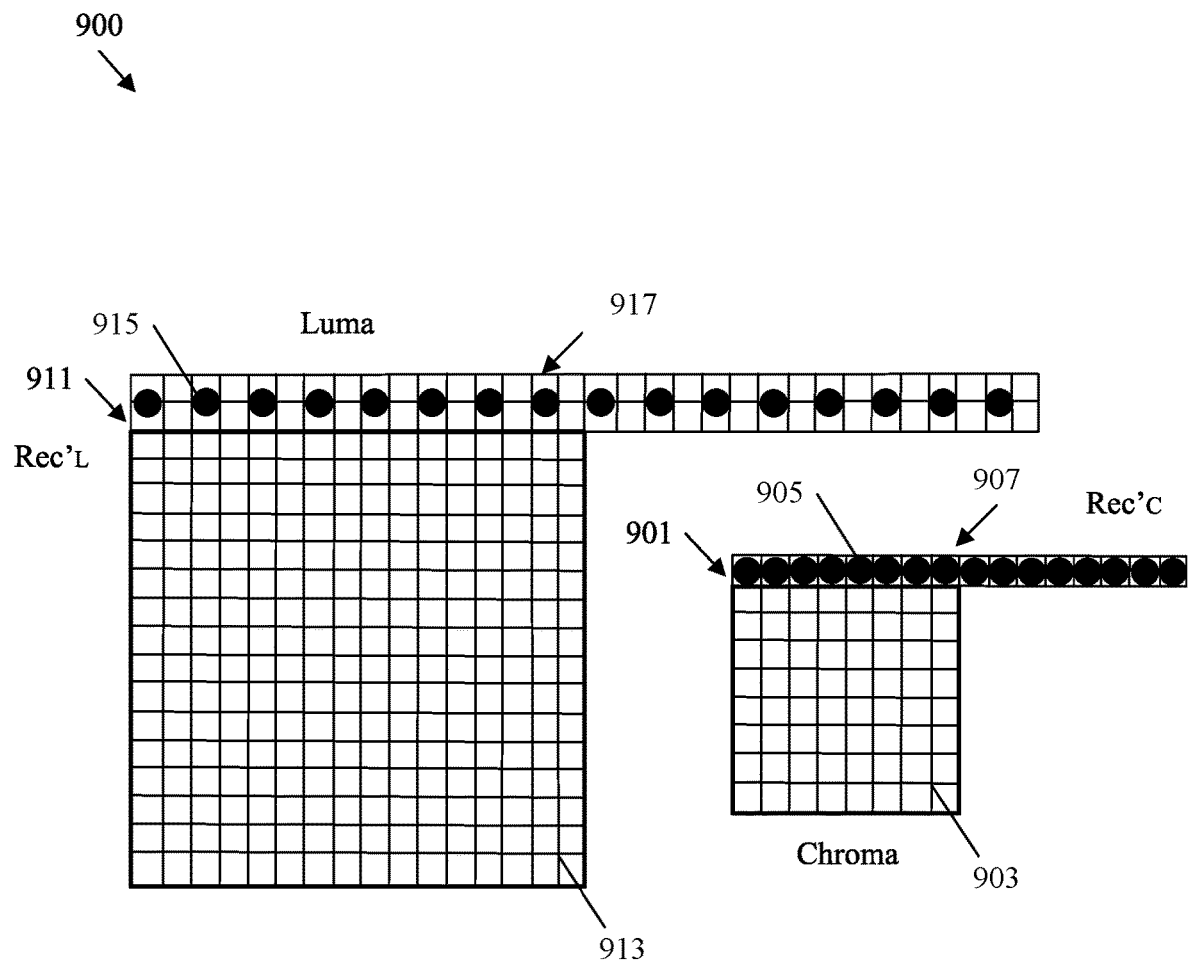
FIGS. 9-10 are schematic diagrams illustrating an example mechanism of performing multi-directional linear model (MDLM) intra-prediction.
Figure 10:
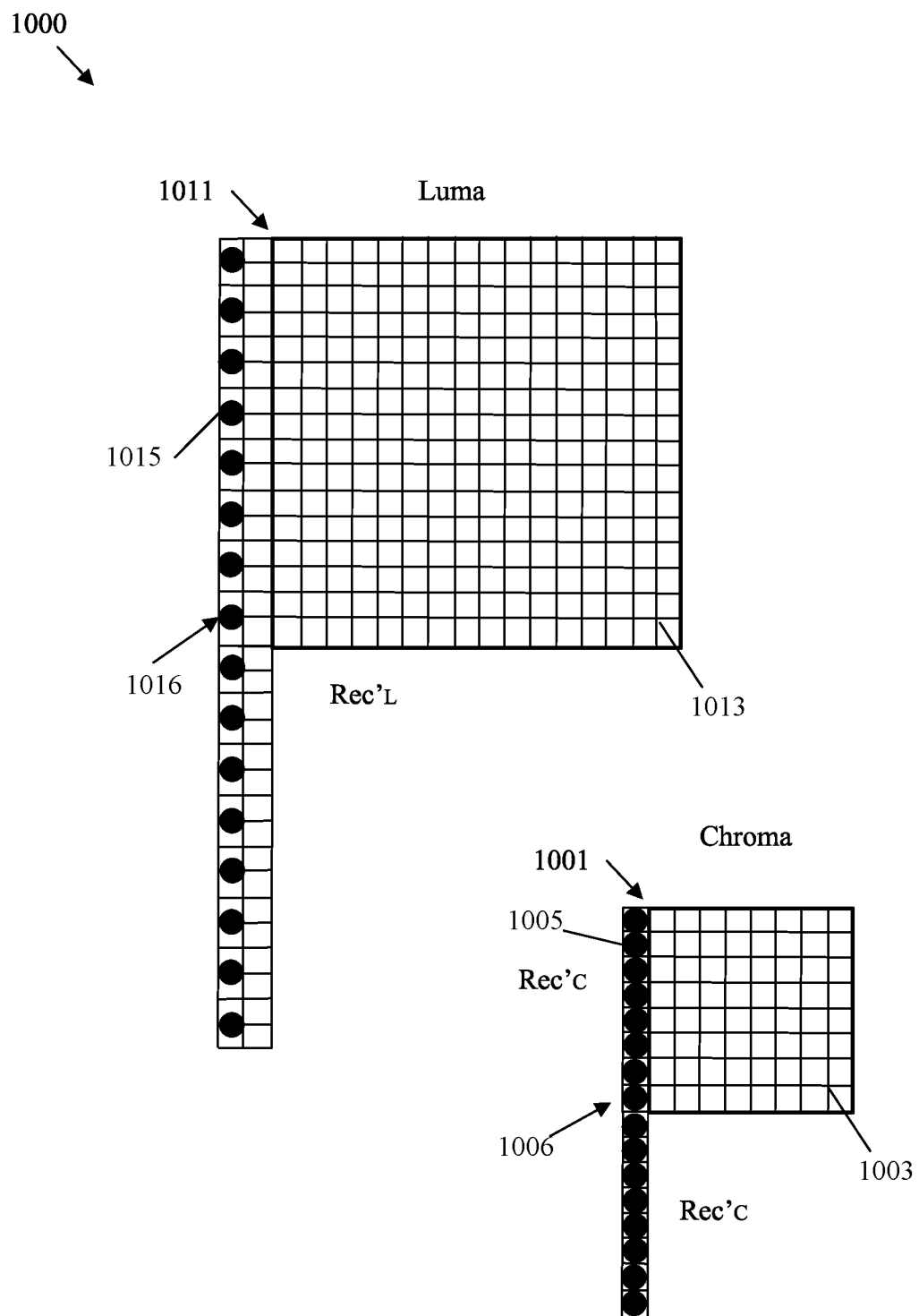

FIGS. 9-10 are schematic diagrams illustrating an example mechanism of performing MDLM intra-prediction. MDLM intra-prediction operates in a manner similar to CCLM intra-prediction 700, but employs different templates. Specifically, MDLM intra-prediction uses both a cross-component linear model prediction (CCIP)_A mode 900 and a CCIP_L mode 1000 when determining linear model coefficients $\alpha$ and $\beta$. For example, MDLM intra-prediction may calculate linear model coefficients $\alpha$ and $\beta$ using CCIP_A mode 900 and CCIP_L mode 1000. MDLM intra-prediction may then select CCIP_A mode 900 or CCIP_L mode 1000 depending on the result that provides the greatest coding efficiency (e.g., the least residual samples). In another example, MDLM intra-prediction may use both CCIP_A mode 900 or CCIP_L mode 1000 to determine linear model coefficients $\alpha$ and $\beta$.

As such, MDLM intra-prediction using CCIP_A mode 900 or CCIP_L mode 1000 is a type of cross-component intra-prediction 600. Accordingly, MDLM intra-prediction using CCIP_A mode 900 or CCIP_L mode 1000 may be performed by an intra-picture estimation component 215 and/or an intra-picture prediction component 217 of a codec system 200, an intra-picture prediction component 317 of an encoder 300, and/or an intra-picture prediction component 417 of a decoder 400. Specifically, MDLM intra-prediction using CCIP_A mode 900 or CCIP_L mode 1000 can be employed during block compression at step 105 of method 100 and during block decoding at step 113 of method 100 at an encoder and a decoder, respectively.

CCIP_A mode 900 generates a model to predict chroma samples 903 in a chroma block 901 based on luma reference samples 913 in a luma block 911, where the luma block 911 is in the same CU as the chroma block 901, in a manner similar to CCLM intra-prediction 700. Specifically, a linear model is generated according to equation 1 above. Further, a template 917 and a corresponding template 907 are employed to select neighboring luma reference samples 915 and neighboring chroma reference samples 905 in a manner similar to CCLM intra-prediction 700. The difference is that the templates 907 and 917 are shaped differently. As with CCLM intra-prediction 700, CCIP_A mode 900 down-samples the neighboring luma reference samples 915 and the luma reference samples 913. CCIP_A mode 900 uses the luma reference samples 913 to determine Rec'L in equation 1. CCIP_A mode 900 then uses down-sampled neighboring luma reference samples 915 and neighboring chroma reference samples 905 to determine linear model coefficients $\alpha$ and $\beta$. The linear model coefficients $\alpha$ and $\beta$ can then be employed to complete the linear model according to equation 1 to obtain the prediction for the chroma samples 903.

The templates 907 and 917 are applied to neighboring chroma blocks and luma blocks, respectively, that are above and directly adjacent to the chroma block 901 and the corresponding luma block 911, respectively. The templates 907 and 917 do not obtain samples to the left to the chroma block 901 and the corresponding luma block 911. As templates 907 and 917 are only applied above the chroma block 901 and the luma block 911, the templates 907 and 917 are extended horizontally past the chroma block 901 and the corresponding luma block 911, respectively, to obtain more samples. This may allow templates 907 and 917 to obtain an equivalent number of neighboring chroma reference samples 905 and neighboring luma reference samples 915, respectively, to the numbers used by the CCLM intra-prediction 700 when determining linear model coefficients $\alpha$ and $\beta$.

CCIP_L mode 1000 generates a model to predict chroma samples 1003 in a chroma block 1001 based on luma reference samples 1013 in a luma block 1011, where the luma block 1011 is in the same CU as the chroma block 1001, in a manner similar to CCLM intra-prediction 700. Specifically, a linear model is generated according to equation 1 above. Further, a template 1016 and a corresponding template 1006 are employed to select neighboring luma reference samples 1015 and neighboring chroma reference samples 1005 in a manner similar to CCLM intra-prediction 700. The difference is that the templates 1006 and 1016 are shaped differently. As with CCLM intra-prediction 700, CCIP_L mode 1000 down-samples the neighboring luma reference samples 1015 and the luma reference samples 1013. CCIP_A mode 1000 uses the luma reference samples 1013 to determine Rec'L in equation 1. CCIP_A mode 1000 then uses down-sampled neighboring luma reference samples 1015 and neighboring chroma reference samples 1005 to determine linear model coefficients $\alpha$ and $\beta$. The linear model coefficients $\alpha$ and $\beta$ can then be employed to complete the linear model according to equation 1 to obtain the prediction for the chroma samples 1003.

The templates 1006 and 1016 are applied to neighboring chroma blocks and luma blocks, respectively, that are to the left to and directly adjacent to the chroma block 1001 and the corresponding luma block 1011, respectively. The templates 1006 and 1016 do not obtain samples above the chroma block 1001 and the corresponding luma block 1011. As templates 1006 and 1016 are only applied to the left to the chroma block 1001 and the luma block 1011, the templates 1006 and 1016 are extended vertically below the chroma block 1001 and the corresponding luma block 1011, respectively, to obtain more samples. This may allow templates 1006 and 1016 to obtain an equivalent number of neighboring chroma reference samples 1005 and neighboring luma reference samples 1015, respectively, to the numbers used by the CCLM intra-prediction 700 when determining linear model coefficients $\alpha$ and $\beta$.

As noted above, the neighboring luma reference samples 915 and 1015 and the luma reference samples 913 and 1013 are down-sampled prior to generating the linear model. Further, employing multiple lines and columns to generate the neighboring luma reference samples 915 and 1015 does not significantly increase the accuracy of the remaining calculations pursuant to MDLM intra-prediction using CCIP_A mode 900 and/or CCIP_L mode 1000. As such, a single row and/or column of neighboring luma reference samples 915 and 1015 can be employed during down-sampling, which reduces utilization of the line buffer memory without significantly impacting the accuracy and/or coding efficiency of MDLM intra-prediction.

Figure 11:
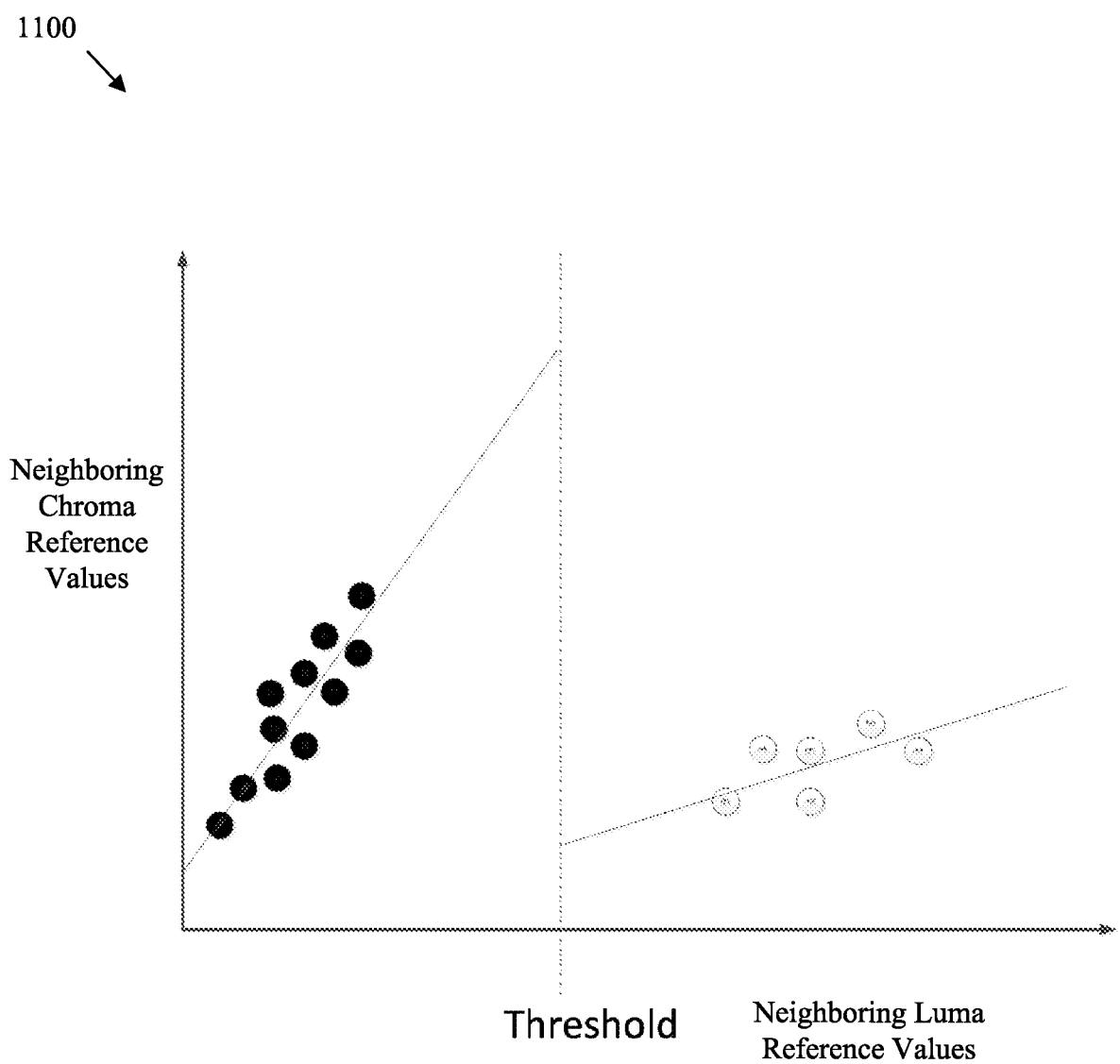
FIG. 11 is a graph illustrating an example mechanism of determining linear model parameters to support multiple model CCLM (MMLM) intra-prediction.

FIG. 11 is a graph 1100 illustrating an example mechanism of determining linear model parameters to support MMLM intra-prediction. MMLM intra-prediction, as shown in graph 1100 is a type of cross-component intra-prediction 600. Hence, MMLM intra-prediction may be performed by an intra-picture estimation component 215 and/or an intra-picture prediction component 217 of a codec system 200, an intra-picture prediction component 317 of an encoder 300, and/or an intra-picture prediction component 417 of a decoder 400. Specifically, MMLM intra-prediction can be employed during block compression at step 105 of method 100 and during block decoding at step 113 of method 100 at an encoder and a decoder, respectively.

MMLM intra-prediction is similar to CCLM intra-prediction 700. The difference is that in MMLM, the neighboring chroma reference samples 705, the neighboring luma reference samples 715, and the luma reference samples 713 are placed into groups by comparing the relevant luma value (e.g., Rec'L) to a threshold. CCLM intra-prediction 700 is then performed on each group to determine linear model coefficients $\alpha$ and $\beta$ and complete a corresponding linear model according to equation 1. The prediction for each group may be determined according to equation six below:

$$\begin{cases} Pred_C[x, y] = \alpha_1 \times Rec'_L[x, y] + \beta_1 & \text{if } Rec'_L[x, y] \le \text{Threshold} \\ Pred_C[x, y] = \alpha_2 \times Rec'_L[x, y] + \beta_2 & \text{if } Rec'_L[x, y] > \text{Threshold} \end{cases} \quad (6)$$

where the variables of equation 6 is defined similarly to equation 1 with a subscript of one indicating relation to a first group and a subscript of two indicating a relationship to a second group.

As shown by graph 1100, linear model coefficients $\alpha_1$ and $\beta_1$ can be calculated for a first group and linear model coefficients $\alpha_2$ and $\beta_2$ can be calculated for a second group. As a specific example, such values may be an $\alpha_1$ of two, a $\beta_1$ of one, an $\alpha_2$ of one half, and a $\beta_2$ of negative one where the threshold is a luma value of seventeen. The MMLM intra-prediction can then select the resulting model that provides the least residual samples and/or results in the greatest coding efficiency.

As with the other cross component intra-prediction modes discussed herein, the neighboring luma reference samples and the luma reference samples are down-sampled prior to generating the linear model. Further, employing multiple lines and columns to generate the neighboring luma reference samples does not significantly increase the accuracy of the remaining calculations pursuant to MMLM intra-prediction. As such, a single row and/or column of neighboring luma reference samples can be employed during down-sampling, which reduces utilization of the line buffer memory without significantly impacting the accuracy and/or coding efficiency of MMLM intra-prediction.

It should be noted that the encoder may select the intra-prediction mode used (e.g., CCLM, MDLM, and/or MMLM) as well as select the relevant model to use (e.g., CCIP_A, CCIP_L, group one, group two, etc.) as part of the corresponding intra-prediction mode. Such information can be signaled to the decoder in syntax, for example by employing flags. The decoder can then use the indicated intra-prediction mode to reconstruct the chroma samples for a chroma block.

FIGS. 12-15 are schematic diagrams illustrating example mechanisms 1200, 1300, 1400, and 1500 of down-sampling to support cross-component intra-prediction, for example according to cross-component intra-prediction 600, CCLM intra-prediction 700, mechanism 800, MDLM intra-prediction using CCIP_A mode 900 and CCIP_L mode 1000, and/or MMLM intra-prediction as depicted in graph 1100. Hence, mechanisms 1200, 1300, and 1400 can be may be performed by an intra-picture estimation component 215 and/or an intra-picture prediction component 217 of a codec system 200, an intra-picture prediction component 317 of an encoder 300, and/or an intra-picture prediction component 417 of a decoder 400. Specifically, mechanisms 1200, 1300, 1400, and 1500 can be employed during block compression at step 105 of method 100 and during block decoding at step 113 of method 100 at an encoder and a decoder, respectively.

Figure 12:
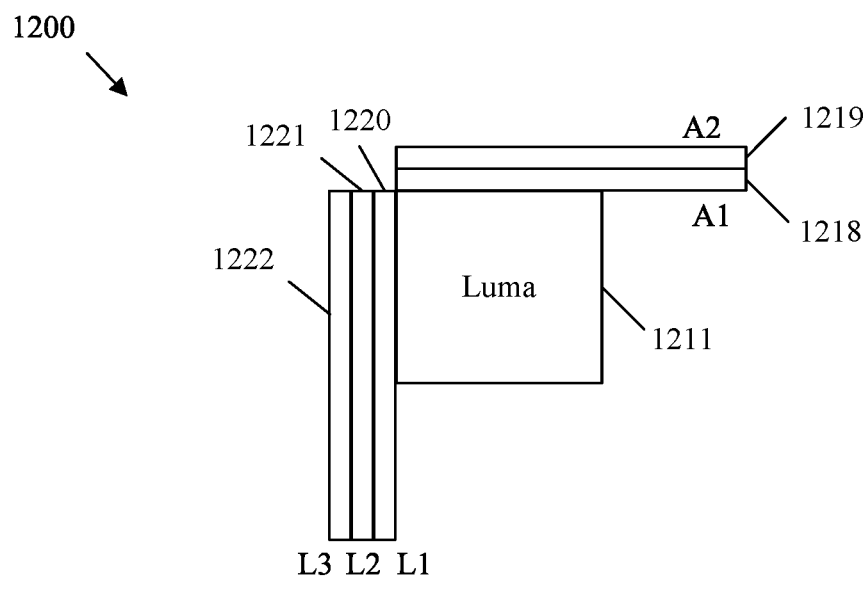
FIGS. 12-15 are schematic diagrams illustrating example mechanisms of down-sampling to support cross-component intra-prediction.
Figure 12:
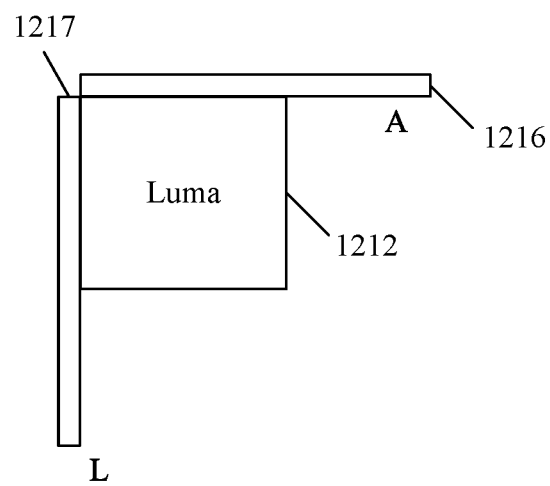
Figure 13:
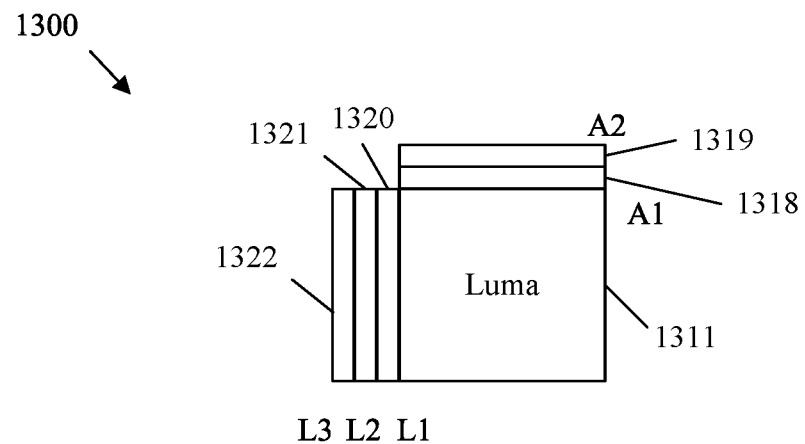
Figure 13:
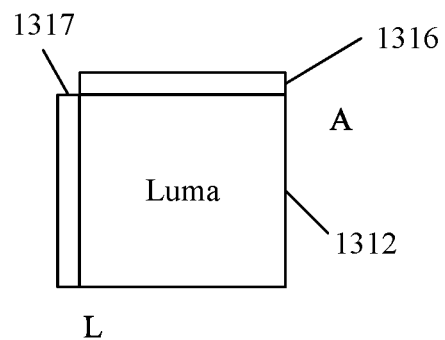
Figure 14:
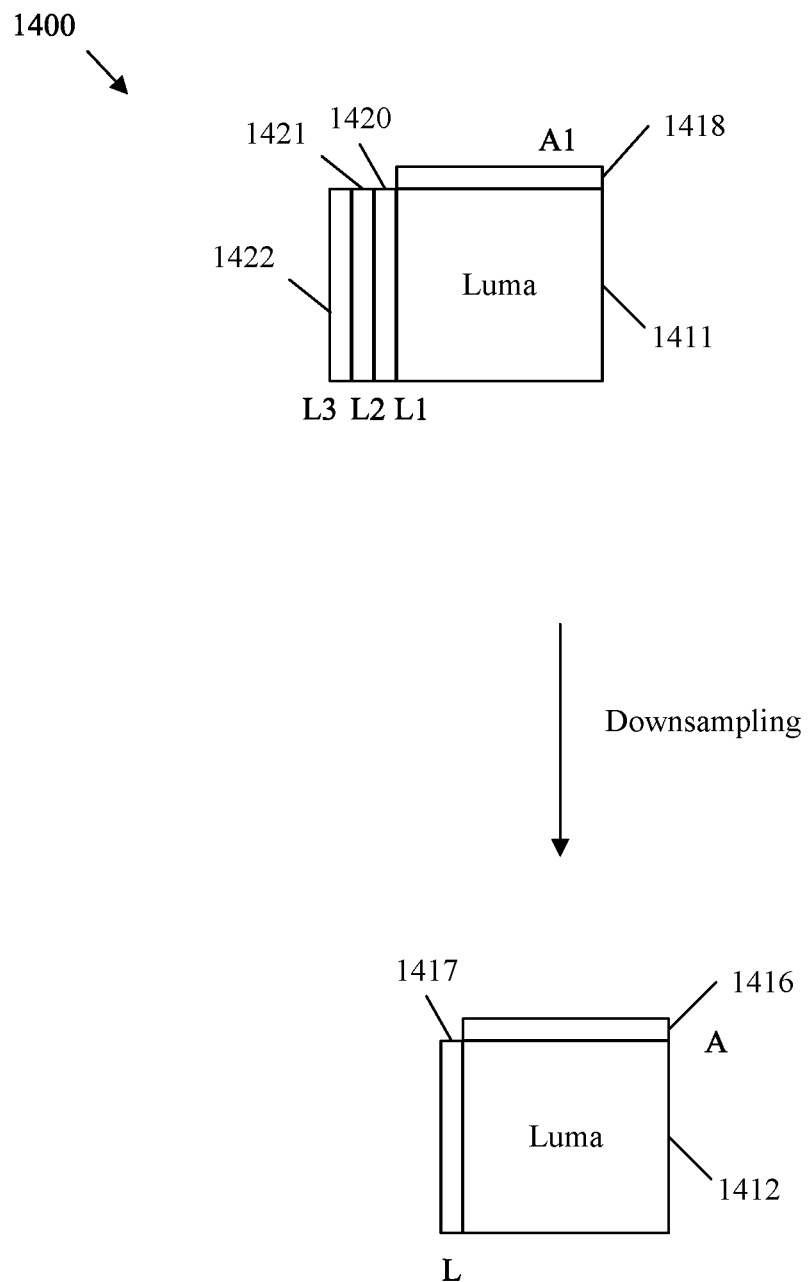
Figure 15:
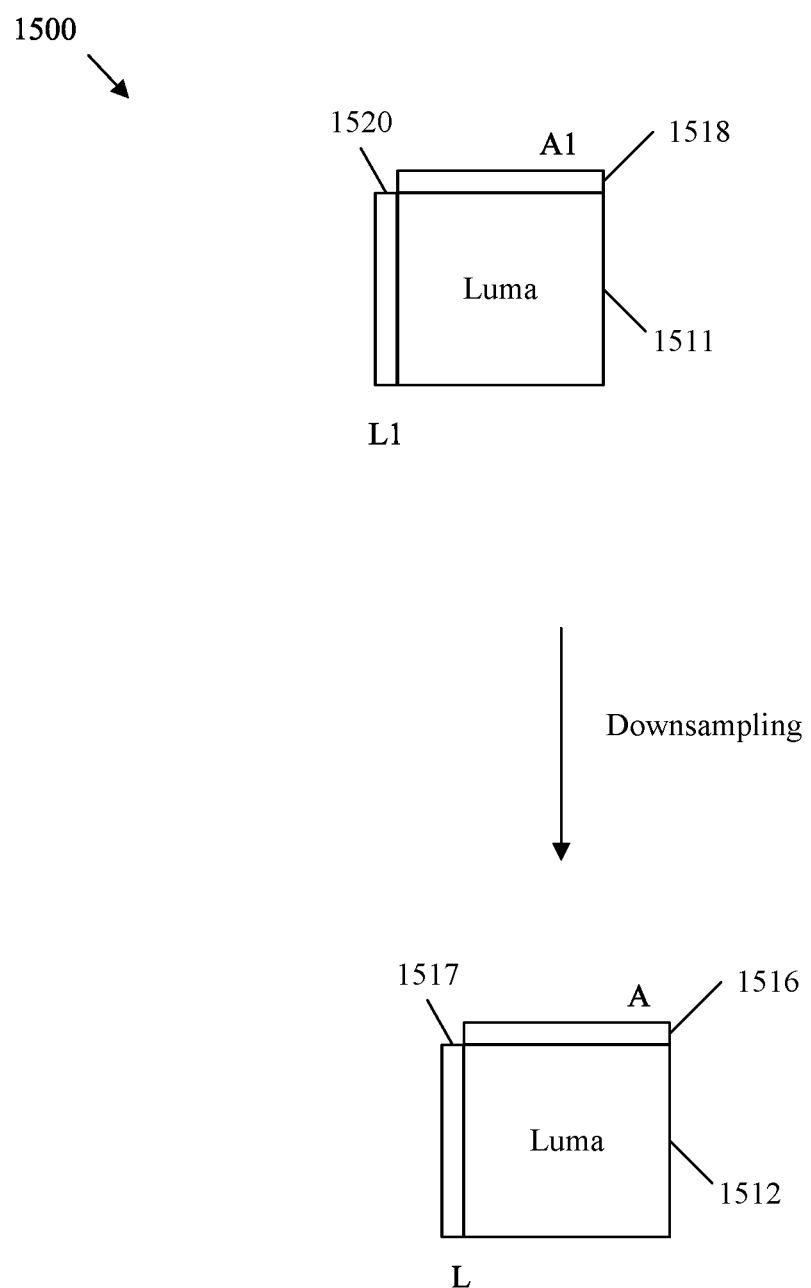

Mechanism 1200 down-samples two rows 1218 and 1219 of neighboring luma reference samples and three columns 1220, 1221, and 1222 of neighboring luma reference samples. The rows 1218 and 1219 and columns 1220, 1221, and 1222 are directly adjacent to a luma block 1211 that shares a CU with a chroma block being predicted according to cross-component intra-prediction. After down-sampling, the rows 1218 and 1219 of neighboring luma reference samples become a single row 1216 of down-sampled neighboring luma reference samples. Further, the columns 1220, 1221, and 1222 of neighboring luma reference samples are down-sampled resulting in a single column 1217 of down-sampled neighboring luma reference samples. In addition, the luma samples of the luma block 1211 are down-sampled to create down-sampled luma reference samples 1212. The down-sampled luma reference samples 1212 and the down-sampled neighboring luma reference samples from the row 1216 and the column 1217 can then be employed for cross-component intra-prediction according to equation 1. It should be noted that the dimensions of rows 1218 and 1219 and columns 1220, 1221, and 1222 may extend beyond the luma block 1211 as shown in FIG. 12. For example, the number of top neighboring luma reference samples in each row 1218/1219, which may be denoted as M, is larger than the number of luma samples in a row of the luma block 1211, which may be denoted as W. Further, the number of left neighboring luma reference samples in each column 1220/1221/1222, which may be denoted as N, is larger than the number of luma samples in a column of the luma block 1211, which may be denoted as H.

In an example, mechanism 1200 may be implemented as follows. For a luma block 1211, the two top neighboring rows 1218 and 1219, denoted as A1 and A2, are used for down-sampling to get down-sampled neighboring row 1216 denoted as A. A[i] is the ith sample in A, A1[i] is the ith sample in A1, and A2[i] is the ith sample in A2. In a specific example, a six tap down-sampling filter can be applied to neighboring rows 1218 and 1219 to obtain the down-sampled neighboring row 1216 according to equation 7.

$$A[i]=(A2[2i]*2+A2[2i-1]+A2[2i+1]+A1[2i]*2+A1[2i-1]+A1[2i+1]+4)>>3; \quad (7)$$

Further, the left neighboring columns 1220, 1221, and 1222 are denoted as L1, L2, and L3 and are used for down-sampling to obtain a down-sampled neighboring column 1217 denoted as L. L[i] is the ith sample in L, L1[i] is the ith sample in L1, L2[i] is the ith sample in L2, and L3[i] is the ith sample in L3. In an specific example, a six tap down-sampling filter can be applied to neighboring columns 1220, 1221, and 1222 to obtain down-sampled neighboring column 1217 according to equation 8.

$$L[i]=(L2[2i]*2+L1[2i]+L3[2i]+L2[2i+1]*2+L1[2i+1]+L3[2i+1]+4)>>3; \quad (8)$$

Mechanism 1300 is substantially similar to mechanism 1200. Mechanism 1300 includes a luma block 1311 with neighboring rows 1318 and 1319 and columns 1320, 1321, and 1322 of neighboring luma reference samples, which are similar to luma block 1211, rows 1218 and 1219, and columns 1220, 1221, and 1222, respectively. The difference is that rows 1318 and 1319 and columns 1320, 1321, and 1322 do not extend past the luma block 1211. As in mechanism 1200, the luma block 1311, rows 1318 and 1319 and columns 1320, 1321, and 1322 are down-sampled to create down-sampled luma reference samples 1312, column 1317, and row 1316 containing down-sampled neighboring luma reference samples. Column 1317 and row 1316 do not extend beyond the block of down-sampled luma reference samples 1312. Otherwise, down-sampled luma reference samples 1312, column 1317, and row 1316 are substantially similar to down-sampled luma reference samples 1212, column 1217, and row 1216, respectively.

Mechanism 1400 is similar to mechanisms 1200 and 1300 but employs a single row 1218 of neighboring luma reference samples instead of two rows. Mechanism 1400 also employs three columns 1420, 1421, and 1422 of neighboring luma reference samples. The row 1418 and columns 1420, 1421, and 1422 are directly adjacent to a luma block 1411 that shares a CU with a chroma block being predicted according to cross-component intra-prediction. After down-sampling, the row 1418 of neighboring luma reference samples becomes a row 1416 of down-sampled neighboring luma reference samples. Further, the columns 1420, 1421, and 1422 of neighboring luma reference samples are down-sampled resulting in a single column 1417 of down-sampled neighboring luma reference samples. Further, the luma samples of the luma block 1411 are down-sampled to create down-sampled luma reference samples 1412. The down-sampled luma reference samples 1412 and the down-sampled neighboring luma reference samples from the row 1416 and the column 1417 can then be employed for cross-component intra-prediction according to equation 1.

During down-sampling, the rows and columns are stored in memory in a line buffer. By, omitting row 1319 during down-sampling and instead using a single row 1418 of values significantly decreases memory usage in the line buffer. However, the down-sampled neighboring luma reference samples from the row 1316 have been found to be substantially similar to the down-sampled neighboring luma reference samples from the row 1416. As such, omitting row 1319 during down-sampling and instead using a single row 1418 results in reduced memory utilization in the line buffer, and hence better processing speed, greater parallelism, fewer memory requirements, etc., without sacrificing accuracy and hence coding efficiency. Accordingly, in one example embodiment, a single row 1418 of neighboring luma reference samples are down-sampled for use in cross-component intra-prediction.

In an example, mechanism 1400 may be implemented as follows. For a luma block 1411, the top neighboring row 1418, denoted as A1, is used for down-sampling to get down-sampled neighboring row 1416 denoted as A. A[i] is the ith sample in A and A1 [i] is the ith sample in A1. In an specific example, a three tap down-sampling filter can be applied to neighboring row 1418 to obtain the down-sampled neighboring row 1416 according to equation 9.

$$A[i]=(A1[2i]*2+A1[2i-1]+A1[2i+1]+2)>>2; \quad (9)$$

Further, the left neighboring columns 1420, 1421, and 1422 are denoted as L1, L2, and L3 and are used for down-sampling to obtain a down-sampled neighboring column 1417 denoted as L. L[i] is the ith sample in L, L1[i] is the ith sample in L1, L2[i] is the ith sample in L2, and L3[i] is the ith sample in L3. In a specific example, a six tap down-sampling filter can be applied to neighboring columns 1320, 1321, and 1322 to obtain down-sampled neighboring column 1317 according to equation 10.

$$L[i]=(L2[2i]*2+L1[2i]+L3[2i]+L2[2i+1]*2+L1[2i+1]+L0[2i+1]+4)>>3; \quad (10)$$

It should be noted that the mechanism 1400 is not limited to the down-sampling filters described. For example, instead of employing a three tap down-sampling filter as described in equation 9, the samples can also be fetched directly as in equation 11 below.

$$A[i]=A1[2i]; \quad (11)$$

Mechanism 1500 is similar to mechanism 1300 but employs a single row 1518 of neighboring luma reference samples and a single column 1520 of neighboring luma reference samples instead of two rows 1318 and 1319 and three columns 1320, 1321, and 1322, respectively. The row 1518 and column 1520 are directly adjacent to a luma block 1511 that shares a CU with a chroma block being predicted according to cross-component intra-prediction. After down-sampling, the row 1518 of neighboring luma reference samples becomes a row 1516 of down-sampled neighboring luma reference samples. Further, the column 1520 of neighboring luma reference samples are down-sampled resulting in a single column 1517 of down-sampled neighboring luma reference samples. The down-sampled neighboring luma reference samples from the row 1516 and the column 1517 can then be employed for cross-component intra-prediction according to equation 1.

Mechanism 1500 omits row 1319 and columns 1321 and 1322 during down-sampling and instead using a single row 1518 and single column 1520 of values, which significantly decreases memory usage in the line buffer. However, the down-sampled neighboring luma reference samples from the row 1316 and column 1317 have been found to be substantially similar to the down-sampled neighboring luma reference samples from the row 1516 and column 1517, respectively. As such, omitting row 1319 and columns 1321 and 1322 during down-sampling and instead using a single row 1518 and column 1520 results in reduced memory utilization in the line buffer, and hence better processing speed, greater parallelism, fewer memory requirements, etc., without sacrificing accuracy and hence coding efficiency. Accordingly, in another example embodiment, a single row 1518 of neighboring luma reference samples and a single column 1520 of neighboring luma reference samples are down-sampled for use in cross-component intra-prediction.

In an example, mechanism 1500 may be implemented as follows. For a luma block 1511, the top neighboring row 1518, denoted as A1, is used for down-sampling to get down-sampled neighboring row 1516 denoted as A. A[i] is the ith sample in A and A1[i] is the ith sample in A1. In a specific example, a three tap down-sampling filter can be applied to neighboring row 1518 to obtain the down-sampled neighboring row 1516 according to equation 12.

$$A[i]=(A1[2i]*2+A1[2i-1]+A1[2i+1]+2)>>2; \quad (12)$$

Further, the left neighboring column 1520 is denoted as L1 is used for down-sampling to obtain a down-sampled neighboring column 1517 denoted as L. L[i] is the ith sample in L and L1[i] is the ith sample in L1. In a specific example, a two tap down-sampling filter can be applied to neighboring column 1520 to obtain down-sampled neighboring column 1517 according to equation 13.

$$L[i]=(L1[2i]+L1[2i+1]+1)>>2; \quad (13)$$

In an alternate example, mechanism 1500 could be modified to employ an L2 column (e.g., column 1321) instead of an L1 column (e.g., column 1520) when down-sampling. In such a case, a two tap down-sampling filter can be applied to neighboring column L2 to obtain down-sampled neighboring column 1517 according to equation 14. It should be noted that the mechanism 1500 is not limited to the down-sampling filters described. For example, instead of employing a two tap and a three tap down-sampling filter as described in equations 12 and 13, the samples can also be fetched directly as in equations 14 and 15 below.

$$A[i]=A1[2i]; \quad (14)$$

$$L[i]=L2[2i]; \quad (15)$$

Further, it should also be noted that mechanisms 1400 and 1500 can also be applied when the dimensions of rows 1418, 1416, 1518, 1516 and/or columns 1420, 1421, 1422, 1417, 1520, and/or 1517 extend beyond the corresponding luma block 1411 and/or 1511 (e.g., as shown in FIG. 12).

Figure 16:
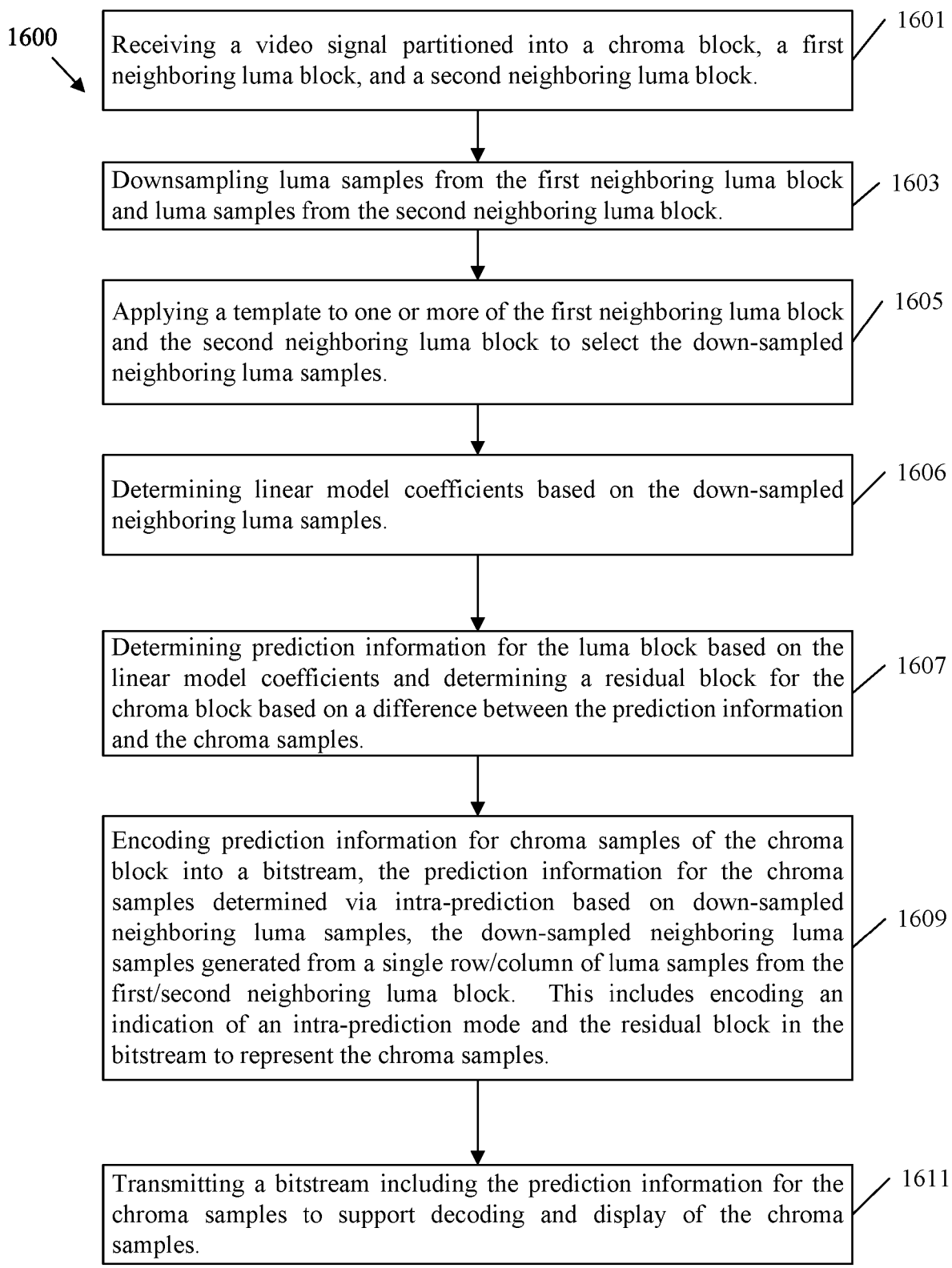
FIG. 16 is a flowchart of an example method of employing down-sampling while performing cross-component intra-prediction at an encoder.

FIG. 16 is a flowchart of an example method 1600 for cross-component prediction of a block of video data. At step 1601, a reconstructed luma block is down-sampled to obtain a down-sampled luma block. The reconstructed luma block corresponds to a chroma block. At step 1603, first down-sampled samples of reconstructed top neighboring luma samples that are above the reconstructed luma block and/or second down-sampled samples of reconstructed left neighboring luma samples that are left to the reconstructed luma block are obtained. The reconstructed top neighboring luma samples are within a single row being adjacent to the reconstructed luma block. At step 1605, parameters of a LM are derived based on the first and/or second down-sampled samples, and reconstructed neighboring chroma samples that are above the chroma block and/or reconstructed neighboring chroma samples that are left to the chroma block. At step 1607, predicted chroma values of the chroma block are generated based on the parameters of the LM and the down-sampled luma block.

Specifically, in the case of MDLM intra-prediction using CCIP_A mode 900, the parameters of a LM are derived based on the first down-sampled samples and reconstructed neighboring chroma samples that are above the chroma block. In the case of MDLM intra-prediction using CCIP_L mode 1000, the parameters of a LM are derived based on the second down-sampled samples and reconstructed neighboring chroma samples that are left to the chroma block. In the case of CCLM intra-prediction, the parameters of a LM are derived based on the first and second down-sampled samples, and reconstructed neighboring chroma samples that are above the chroma block and reconstructed neighboring chroma samples that are left to the chroma block.

It should be noted that the reconstructed neighboring luma samples left to the reconstructed luma block may include N columns of luma samples which are left to the reconstructed luma block, wherein 0<N<=3 and N is a positive integer. Further, the reconstructed neighboring luma samples left to the reconstructed luma block may include a single column of luma samples which are left to the reconstructed luma block. In addition, the LM may comprise one or more of: CCLM mode, MDLM mode, and MMLM mode.

Figure 17:
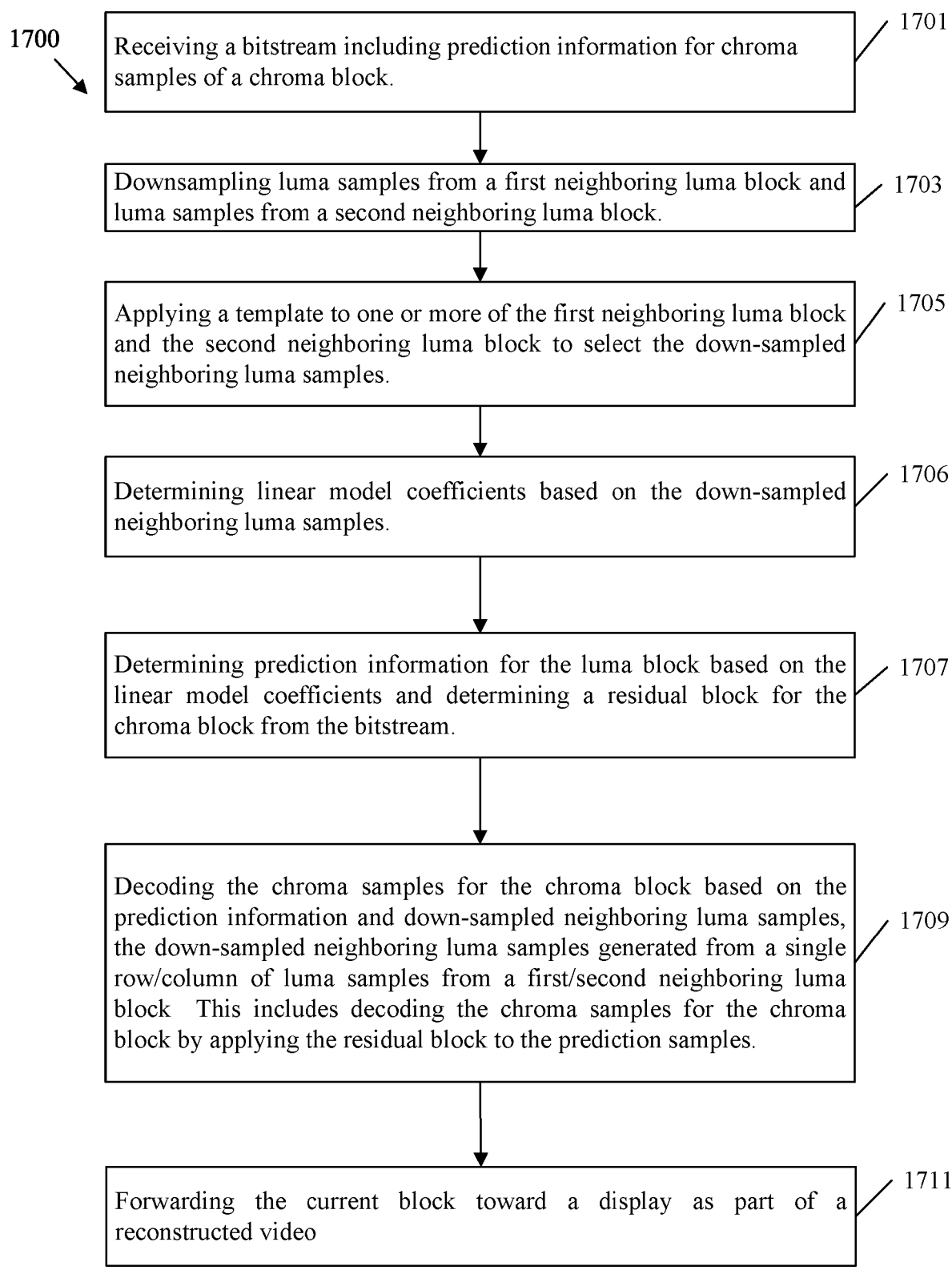
FIG. 17 is a flowchart of an example method of employing down-sampling while performing cross-component intra-prediction at a decoder.

FIG. 17 is a flowchart of another example method for cross-component prediction of a block of video data. At step 1701, a reconstructed luma block is down-sampled to obtain a down-sampled luma block. The reconstructed luma block corresponds to a chroma block. At step 1703, a max luma value and a min luma value are determined based on first down-sampled samples of reconstructed top neighboring luma samples that are above the reconstructed luma block and/or second down-sampled samples of reconstructed left neighboring luma samples that are left to the reconstructed luma block, wherein the reconstructed top neighboring luma samples are within a single row being adjacent to the reconstructed luma block. At step 1705, a first chroma value and a second chroma are determined based on reconstructed neighboring chroma samples of the chroma block, wherein the first chroma value and the second chroma value are respectively associated with the max luma value and min luma value. At step 1707, parameters of a LM are derived based on the max luma value and the min luma value and the first chroma value and the second chroma value. At step 1709, predicted chroma values of the chroma block are generated based on the parameters of the LM and the down-sampled luma block.

Specifically, in the case of MDLM intra-prediction using CCIP_A mode 900, a max luma value and a min luma value are determined based on the first down-sampled samples of reconstructed top neighboring luma samples that are above the reconstructed luma block. In the case of MDLM intra-prediction using CCIP_L mode 1000, a max luma value and a min luma value are determined based on second down-sampled samples of reconstructed left neighboring luma samples that are left to the reconstructed luma block. In the case of CCLM intra-prediction, a max luma value and a min luma value are determined based on first down-sampled samples of reconstructed top neighboring luma samples that are above the reconstructed luma block and second down-sampled samples of reconstructed left neighboring luma samples that are left to the reconstructed luma block.

It should be noted that the reconstructed neighboring luma samples left to the reconstructed luma block may include N columns of luma samples which are left to the reconstructed luma block, wherein 0<N<=3 and N is a positive integer. Further, the reconstructed neighboring luma samples left to the reconstructed luma block may include a single column of luma samples which are left to the reconstructed luma block. In addition, the LM may comprise one or more of: CCLM mode, MDLM mode, and MMLM mode.

For example, method 1600 may employ mechanism 1300 and/or 1400 as part of cross-component intra-prediction 600, CCLM intra-prediction 700, mechanism 800, MDLM intra-prediction using CCIP_A mode 900 and CCIP_L mode 1000, and/or MMLM intra-prediction as depicted in graph 1100. Further, method 1600 can be may be performed by an intra-picture estimation component 215 and/or an intra-picture prediction component 217 of a codec system 200 as well as an intra-picture prediction component 317 of an encoder 300. Specifically, method 1600 can be employed during block compression at step 105 of method 100 at an encoder.

Method 1600 occurs during block compression, for example as part of a rate distortion optimization process a video signal is received at the encoder. The video signal can be partitioned into a CU containing a chroma block containing chroma samples and a corresponding luma block containing luma samples acting as luma reference samples. The method 1600 can determine to perform cross-component intra-prediction to compress the chroma block of chroma samples.

The down-sampling includes down-sampling a single row of neighboring luma reference samples and/or down-sampling a single column of neighboring luma reference samples.

The cross-component intra-prediction mechanisms employed to encode the chroma samples can include CCLM prediction mode intra-prediction, MDLM prediction mode intra-prediction, and/or MMLM prediction mode intra-prediction.

Linear model coefficients, denoted as $\alpha$ and $\beta$, are determined based on the down-sampled neighboring luma samples and corresponding neighboring chroma samples. As discussed above, the linear model coefficients can be determined by minimizing the regression error between the down-sampled neighboring luma samples and the neighboring chroma samples by employing equations 2 and 3 as discussed hereinabove. In another example, the linear model coefficients can be determined by computing a slope and a Y intercept of a line traversing the minimum and maximum value of the down-sampled neighboring luma reference samples according to equations 4 and 5 as discussed hereinabove.

Prediction information is determined for the chroma samples in the chroma block based on the linear model coefficients. Specifically, the prediction information for the chroma samples can be determined according to equation 1. Hence, such prediction information can be determined based on the values of the down-sampled luma block (such as a luma block') and based on the linear model coefficients $\alpha$ and $\beta$. Once the prediction information is determined, a residual block for the chroma block can be determined based on a difference between the prediction information and the chroma samples.

The residual data for the chroma block are encoded into a bitstream. As noted above, the prediction information for the chroma samples is determined via intra-prediction based on down-sampled neighboring luma samples. Further, the down-sampled neighboring luma samples are generated from a single row of luma samples from the first neighboring block and/or from a single column of luma samples from the second neighboring block. Such encoding includes encoding an indication of an intra-prediction mode (e.g., CCLM, MDLM, and/or MMLM and/or corresponding models/groups) and the residual block in the bitstream to represent the chroma samples.

The bitstream is transmitted toward a decoder. The bitstream includes the prediction information for the chroma samples to support decoding and display of the chroma samples as part of a video stream.

For example, method 1700 may employ mechanism 1300 and/or 1400 as part of cross-component intra-prediction 600, CCLM intra-prediction 700, mechanism 800, MDLM intra-prediction using CCIP_A mode 900 and CCIP_L mode 1000, and/or MMLM intra-prediction as depicted in graph 1100. Further, method 1700 can be may be performed by an intra-picture estimation component 215 and/or an intra-picture prediction component 217 of a codec system 200 as well as an intra-picture prediction component 417 of a decoder 400. Specifically, method 1700 can be employed during block decoding at step 113 of method 100 at a decoder.

Method 1700 occurs during block decoding, for example as part of reconstructing blocks from a bitstream for display. A bitstream is received. The bitstream includes residual data for a chroma block. The method 1700 can determine to perform cross-component intra-prediction to compress the chroma block of chroma samples.

The down-sampling includes down-sampling a single row of neighboring luma reference samples and/or down-sampling a single column of neighboring luma reference samples.

The cross-component intra-prediction mechanism can be indicated by syntax, flags, or other data in the bitstream and can include CCLM prediction mode intra-prediction, MDLM prediction mode intra-prediction, and/or MMLM prediction mode intra-prediction.

Linear model coefficients, denoted as $\alpha$ and $\beta$, are determined based on the down-sampled neighboring luma samples and corresponding neighboring chroma samples. As discussed above, the linear model coefficients can be determined by minimizing the regression error between the down-sampled neighboring luma samples and the neighboring chroma samples by employing equations 2 and 3 as discussed hereinabove. In another example, the linear model coefficients can be determined by computing a slope and a Y intercept of a line traversing the minimum and maximum value of the down-sampled neighboring luma reference samples according to equations 4 and 5 as discussed hereinabove.

Prediction information is determined for chroma samples in the chroma block based on the linear model coefficients. Specifically, the prediction information for the chroma samples can be determined according to equation 1. Hence, such prediction information can be determined based on the values of the down-sampled luma reference samples in the luma block from the same CU as the chroma block and based on the linear model coefficients $\alpha$ and $\beta$ determined at step 1706. Once the prediction information is determined, a residual block can be determined for the chroma block from the bitstream. It should be noted that the preceding items may include determining an indication of an intra-prediction mode (e.g., CCLM, MDLM, and/or MMLM and/or corresponding models/groups) and the residual block from the bitstream.

The chroma samples for the chroma block are decoded based on the prediction information, which is in turn determined via intra-prediction as indicated by the bitstream and based on the down-sampled neighboring luma samples. As noted above, the down-sampled neighboring luma samples are generated from a single row of neighboring luma samples and/or from a single column of neighboring luma samples. Such decoding can include decoding the chroma samples for the chroma block by applying the residual block to the prediction information. At step 1711, the chroma block containing the reconstructed chroma samples is forwarded toward a display as part of a reconstructed video.

Figure 18:
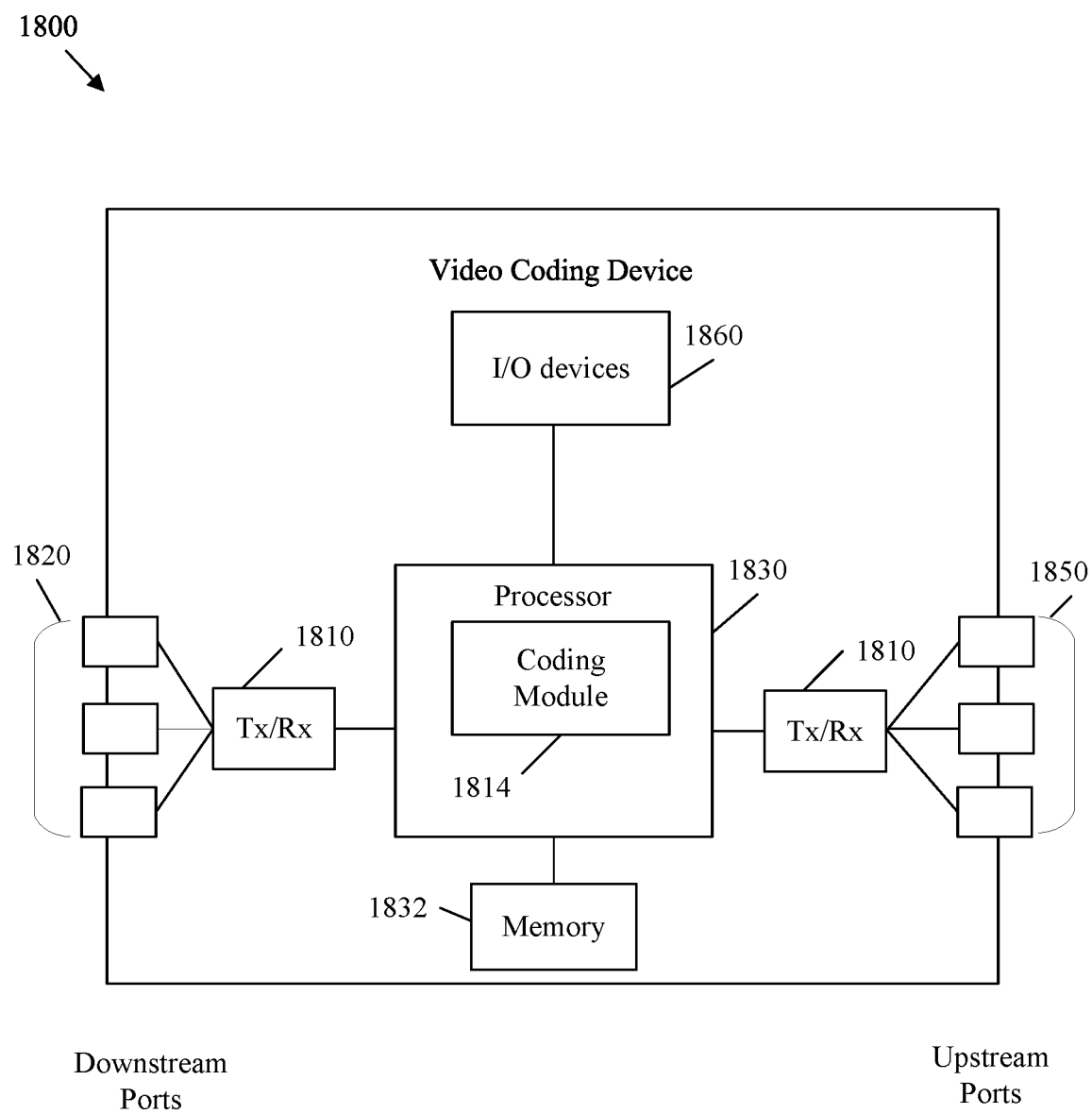
FIG. 18 is a schematic diagram of an example video coding device.

FIG. 18 is a schematic diagram of an example video coding device 1800. The video coding device 1800 is suitable for implementing the disclosed examples/embodiments as described herein. The video coding device 1800 comprises downstream ports 1820, upstream ports 1850, and/or transceiver units (Tx/Rx) 1810, including transmitters and/or receivers for communicating data upstream and/or downstream over a network. The video coding device 1800 also includes a processor 1830 including a logic unit and/or central processing unit (CPU) to process the data and a memory 1832 for storing the data. The video coding device 1800 may also comprise optical-to-electrical (OE) components, electrical-to-optical (EO) components, and/or wireless communication components coupled to the upstream ports 1850 and/or downstream ports 1820 for communication of data via optical or wireless communication networks. The video coding device 1800 may also include input and/or output (I/O) devices 1860 for communicating data to and from a user. The I/O devices 1860 may include output devices such as a display for displaying video data, speakers for outputting audio data, etc. The I/O devices 1860 may also include input devices, such as a keyboard, mouse, trackball, etc., and/or corresponding interfaces for interacting with such output devices.

The processor 1830 is implemented by hardware and software. The processor 1830 may be implemented as one or more CPU chips, cores (e.g., as a multi-core processor), field-programmable gate arrays (FPGAs), application specific integrated circuits (ASICs), and digital signal processors (DSPs). The processor 1830 is in communication with the downstream ports 1820, Tx/Rx 1810, upstream ports 1850, and memory 1832. The processor 1830 comprises a coding module 1814. The coding module 1814 implements the disclosed embodiments described above, such as methods 100, 1600, and 1700 and/or mechanisms 1400 and/1500 as part of intra-prediction 600, CCLM intra-prediction 700, mechanism 800, MDLM intra-prediction using CCIP_A mode 900 and CCIP_L mode 1000, and/or MMLM intra-prediction as depicted in graph 1100, as well as any other method/mechanism described herein. Further, the coding module 1814 may implement a codec system 200, an encoder 300, and/or a decoder 400. For example, the coding module 1814 can be employed to perform cross-component intra-prediction to code chroma samples based on down-sampled luma samples from the same CU and based on a comparison of neighboring chroma reference samples and down-sampled neighboring luma reference samples. This may be accomplished according to equation 1 and equations 2-3 and/or according to equation 1 and equations 4-5. Specifically, the coding module 1814 down-samples the neighboring luma reference samples by employing a single row from a neighboring block above the chroma block and/or a single column from a neighboring block to the left to the chroma block. As noted above, using a single row and/or column reduces usage line buffer memory without significantly reducing coding accuracy and/or coding efficiency. As such, coding module 1814 improves the functionality of the video coding device 1800 as well as addresses problems that are specific to the video coding arts. Further, coding module 1814 effects a transformation of the video coding device 1800 to a different state. Alternatively, the coding module 1814 can be implemented as instructions stored in the memory 1832 and executed by the processor 1830 (e.g., as a computer program product stored on a non-transitory medium).

The memory 1832 comprises one or more memory types such as disks, tape drives, solid-state drives, read only memory (ROM), random access memory (RAM), flash memory, ternary content-addressable memory (TCAM), static random-access memory (SRAM), etc. The memory 1832 may be used as an over-flow data storage device, to store programs when such programs are selected for execution, and to store instructions and data that are read during program execution.

Figure 19:
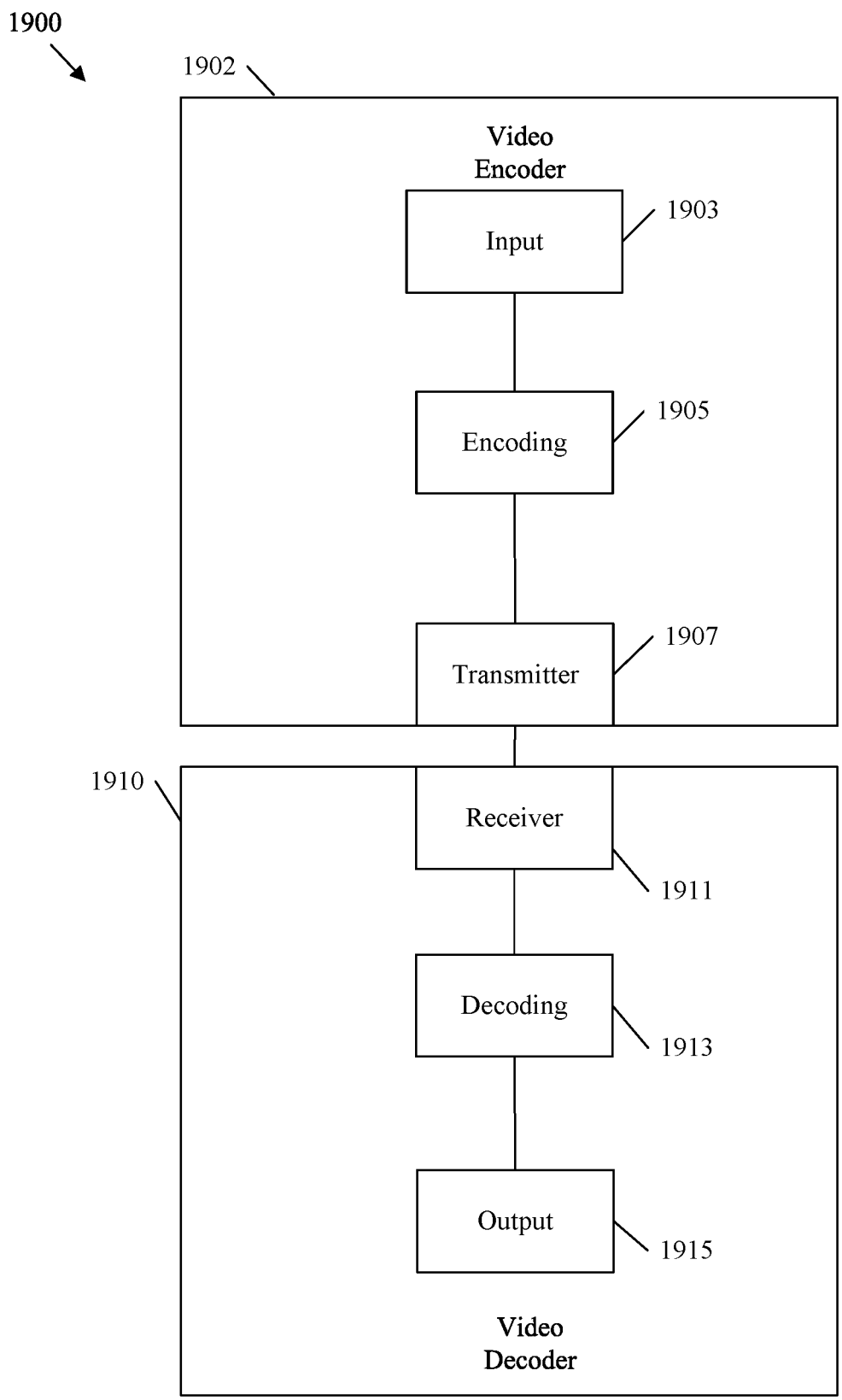
FIG. 19 is a schematic diagram of an example system for employing down-sampling while performing cross-component intra-prediction.
Figure 20:
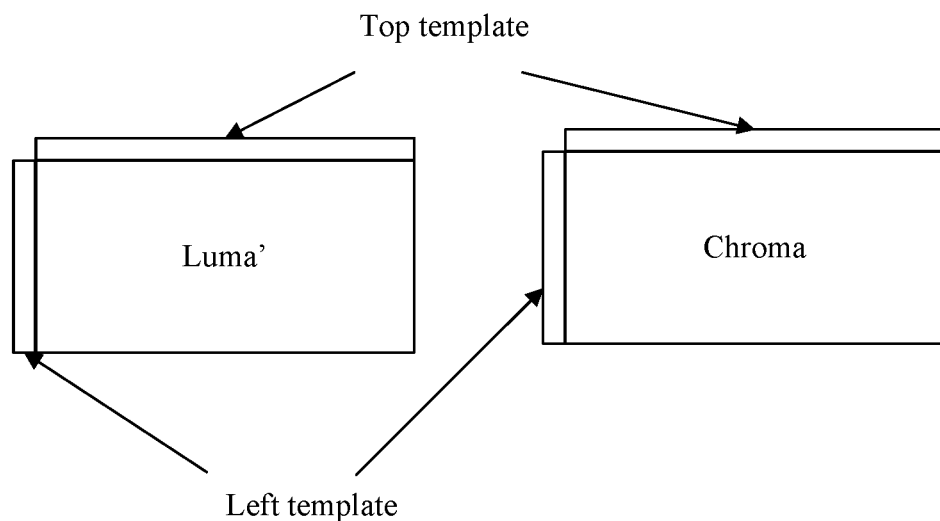
FIG. 20 is an illustration of top template and left template.
Figure 21:
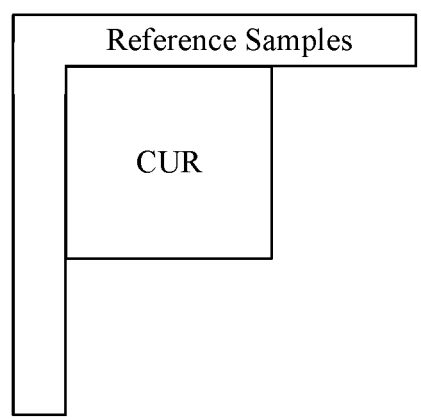
FIG. 21 is an illustration of reference samples.

FIG. 19 is a schematic diagram of an example system 1900 for employing down-sampling while performing cross-component intra-prediction. The system 1900 includes an encoder 1902 and a decoder 1910, which can be implemented by a codec system 200, an encoder 300, and/or a decoder 400.

The encoder 1902 comprises an input module 1903 for receiving a video signal partitioned into a chroma block and a first neighboring block. The encoder 1902 also comprises an encoding module 1905 for encoding prediction information for chroma samples of the chroma block into a bitstream, the prediction information for the chroma samples determined via intra-prediction based on down-sampled neighboring luma samples, the down-sampled neighboring luma samples generated from a single row of luma samples from the first neighboring block. The encoder 1902 also comprises a transmitting module 1907 for transmitting a bitstream including the prediction information for the chroma samples to support decoding and display of the chroma samples. The encoder 1902 is also configured to perform any of the steps of method 1600.

The decoder 1910 comprises a receiving module 1911 for receiving a bitstream including prediction information for chroma samples of a chroma block. The decoder 1910 also comprises a decoding module 1913 for decoding the chroma samples for the chroma block based on the prediction information and down-sampled neighboring luma samples, the down-sampled neighboring luma samples generated from a single row of luma samples from a first neighboring block. The decoder 1910 also comprises an output module 1915 for forwarding the chroma block toward a display as part of a reconstructed video. The decoder 1910 is also configured to perform any of the steps of method 1700.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method for cross-component prediction of a block of video data, the method comprising:
    down-sampling a reconstructed luma block to obtain a down-sampled luma block, the reconstructed luma block corresponding to a chroma block;
    determining a max luma value and a min luma value based on first down-sampled samples of reconstructed top neighboring luma samples that are above the reconstructed luma block or second down-sampled samples of reconstructed left neighboring luma samples within a single column that is left of the reconstructed luma block, wherein the reconstructed top neighboring luma samples are within a single row being adjacent to the reconstructed luma block;
    determining a first chroma value and a second chroma value based on reconstructed neighboring chroma samples of the chroma block, wherein the first chroma value and the second chroma value are respectively associated with the max luma value and the min luma value;
    deriving, parameters of a linear model (LM) based on the max luma value, the min luma value, the first chroma value, and the second chroma value; and
    generating predicted chroma values of the chroma block based on the parameters of the LM and the down-sampled luma block.

2. The method of claim 1, wherein the max luma value is determined based on values of one or more first down-sampled samples that are larger than values of remaining first down-sampled samples.

3. The method of claim 1, wherein the min luma value is obtained based on values of one or more first down-sampled samples that are smaller than values of remaining first down-sampled samples.

4. The method of claim 1, wherein the max luma value is determined based on values of one or more second down-sampled samples that are larger than values of remaining second down-sampled samples.

5. The method of claim 1, wherein the min luma value is obtained based on values of one or more first down-sampled samples that are smaller than values of a rest of the first down-sampled samples.

6. The method of claim 1, wherein the first chroma value is determined based on values of one or more reconstructed neighboring chroma samples, wherein the one or more reconstructed neighboring chroma samples corresponds to one or more of the first down-sampled samples whose values are larger than values of remaining first down-sampled samples, and the second chroma value is determined based on values of one or more reconstructed neighboring chroma samples, wherein the one or more reconstructed neighboring chroma samples correspond to one or more of the first down-sampled samples whose values are smaller than values of the remaining first down-sampled samples.

7. The method of claim 1, wherein the first chroma value is determined based on values of one or more reconstructed neighboring chroma samples, wherein the one or more reconstructed neighboring chroma samples corresponds to one or more of the second down-sampled samples whose values are larger than values of remaining second down-sampled samples, and the second chroma value is determined based on values of one or more reconstructed neighboring chroma samples, wherein the one or more reconstructed neighboring chroma samples correspond to one or more of the second down-sampled samples whose values are smaller than values of the remaining second down-sampled samples.

8. The method of claim 1, wherein the determining a first chroma value and a second chroma value based on reconstructed neighboring chroma samples of the chroma block, comprises:
   determining, from the reconstructed neighboring chroma samples of the chroma block, a first chroma value and a second chroma value respectively corresponding to the max luma value and the min luma value.

9. The method of claim 1, wherein the first down-sampled samples are obtained by down-sampling the reconstructed top neighboring luma samples which are within the single row being adjacent to the reconstructed luma block.

10. The method of claim 1, wherein the second down-sampled samples are obtained by down-sampling on the reconstructed left neighboring luma samples.

11. The method of claim 1, wherein the reconstructed left neighboring luma samples are within N columns which are left of the reconstructed luma block, wherein 0<N<=3 and N is a positive integer.

12. The method of claim 1, wherein the LM comprises one or more of a cross-component linear model (CCLM) mode, a multi-directional linear model (MDLM) mode, and a multiple model linear model (MMLM) mode.

13. A method for cross-component prediction of a block of video data, the method comprising:
   down-sampling a reconstructed luma block to obtain a down-sampled luma block, the reconstructed luma block corresponding to a chroma block;
   determining a max luma value and a min luma value based on first down-sampled samples of reconstructed top neighboring luma samples that are above the reconstructed luma block or second down-sampled samples of reconstructed left neighboring luma samples within N columns which are left of the reconstructed luma block, wherein 0<N<=3 and N is a positive integer, and wherein the reconstructed top neighboring luma samples are within a single row being adjacent to the reconstructed luma block;
   determining a first chroma value and a second chroma value based on reconstructed neighboring chroma samples of the chroma block, wherein the first chroma value and the second chroma value are respectively associated with the max luma value and the min luma value;
   deriving, parameters of a linear model (LM) based on the max luma value, the min luma value, the first chroma value, and the second chroma value; and
   generating predicted chroma values of the chroma block based on the parameters of the LM and the down-sampled luma block.

14. The method of claim 13, wherein the max luma value is determined based on values of one or more first down-sampled samples that are larger than values of remaining first down-sampled samples.

15. The method of claim 13, wherein the min luma value is obtained based on values of one or more first down-sampled samples that are smaller than values of remaining first down-sampled samples.

16. The method of claim 13, wherein the max luma value is determined based on values of one or more second down-sampled samples that are larger than values of remaining second down- sampled samples.

17. The method of claim 13, wherein the min luma value is obtained based on values of one or more first down-sampled samples that are smaller than values of a rest of the first down-sampled samples.

18. A video coding device configured to perform cross-component prediction of a block of video data, the video coding device comprising a processor configured to:
   down-sample a reconstructed luma block to obtain a down-sampled luma block, the reconstructed luma block corresponding to a chroma block;
   determine a max luma value and a min luma value based on first down-sampled samples of reconstructed top neighboring luma samples that are above the reconstructed luma block or second down-sampled samples of reconstructed left neighboring luma samples within N columns which are left of the reconstructed luma block, wherein 0<N<=3 and N is a positive integer, wherein the reconstructed top neighboring luma samples are within a single row being adjacent to the reconstructed luma block;
   determine a first chroma value and a second chroma value based on reconstructed neighboring chroma samples of the chroma block, wherein the first chroma value and the second chroma value are respectively associated with the max luma value and the min luma value;
   derive parameters of a linear model (LM) based on the max luma value, the min luma value, the first chroma value, and the second chroma value; and
   generate predicted chroma values of the chroma block based on the parameters of the LM and the down-sampled luma block.

19. The video coding device of claim 18, wherein the max luma value is determined based on values of one or more first down-sampled samples that are larger than values of remaining first down-sampled samples.

20. The video coding device of claim 18, wherein the min luma value is obtained based on values of one or more first down-sampled samples that are smaller than values of remaining first down-sampled samples.

21. The video coding device of claim 18, wherein the max luma value is determined based on values of one or more second down-sampled samples that are larger than values of remaining second down-sampled samples.

22. The video coding device of claim 18, wherein the min luma value is obtained based on values of one or more first down-sampled samples that are smaller than values of a rest of the first down-sampled samples.

* * * * *